(12) United States Patent
Leidel et al.

(10) Patent No.: US 10,430,190 B2
(45) Date of Patent: Oct. 1, 2019

(54) SYSTEMS AND METHODS FOR SELECTIVELY CONTROLLING MULTITHREADED EXECUTION OF EXECUTABLE CODE SEGMENTS

(71) Applicant: Convey Computer, Richardson, TX (US)

(72) Inventors: John D. Leidel, McKinney, TX (US); Kevin R. Wadleigh, Plano, TX (US); Joe Bolding, Allen, TX (US); Tony Brewer, Plano, TX (US); Dean E. Walker, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 907 days.

(21) Appl. No.: 13/834,362

(22) Filed: Mar. 15, 2013

(65) Prior Publication Data
US 2013/0332711 A1    Dec. 12, 2013

Related U.S. Application Data

(60) Provisional application No. 61/656,829, filed on Jun. 7, 2012.

(51) Int. Cl.
*G06F 9/30* (2018.01)
*G06F 9/38* (2018.01)
*G06F 8/41* (2018.01)

(52) U.S. Cl.
CPC ........ *G06F 9/30145* (2013.01); *G06F 9/3009* (2013.01); *G06F 9/30167* (2013.01);
(Continued)

(58) Field of Classification Search
CPC .. G06F 9/30123; G06F 9/3009; G06F 9/3851; G06F 9/30185; G06F 8/45;
(Continued)

(56) References Cited

U.S. PATENT DOCUMENTS

| 3,434,114 A | 3/1969 | Arulpragasam et al. |
| 4,128,880 A | 12/1978 | Cray, Jr. |

(Continued)

FOREIGN PATENT DOCUMENTS

WO    WO-2008/014494    1/2008

OTHER PUBLICATIONS

"PIC18F6525/6621/8525/8621 Data Sheet", Microchip Data Sheets, 2005, pp. 7-10, 39-69, 87-102 and 275-316.*
(Continued)

*Primary Examiner* — Aimee Li
*Assistant Examiner* — Courtney P Carmichael-Moody
(74) *Attorney, Agent, or Firm* — Norton Rose Fulbright US LLP

(57) ABSTRACT

Systems and methods which provide a modular processor framework and instruction set architecture designed to efficiently execute applications whose memory access patterns are irregular or non-unit stride are disclosed. A hybrid multithreading framework (HMTF) of embodiments provides a framework for constructing tightly coupled, chip-multithreading (CMT) processors that contain specific features well-suited to hiding latency to main memory and executing highly concurrent applications. The HMTF of embodiments includes an instruction set designed specifically to exploit the high degree of parallelism and concurrency control mechanisms present in the HMTF hardware modules. The instruction format implemented by a HMTF of embodiments is designed to give the architecture, the run-time libraries, and/or the application ultimate control over how and when concurrency between thread cache units is initiated. For example, one or more bit of the instruction payload may be designated as a context switch bit (CTX) for expressly controlling context switching.

21 Claims, 3 Drawing Sheets

(52) U.S. Cl.
CPC ........ *G06F 9/30185* (2013.01); *G06F 9/3851* (2013.01); *G06F 8/45* (2013.01)

(58) Field of Classification Search
CPC ... G06F 15/80; G06F 8/41; G06F 9/48; G06F 1/3203; G06F 1/3206; G06F 9/30189; G06F 9/30145; G06F 9/30181
USPC ...................................................... 712/200
See application file for complete search history.

(56) References Cited

U.S. PATENT DOCUMENTS

| | | | |
|---|---|---|---|
| 4,241,399 A | 12/1980 | Strecker et al. | |
| 4,386,399 A | 5/1983 | Rasala et al. | |
| 4,504,902 A | 3/1985 | Gallaher et al. | |
| 4,669,043 A | 5/1987 | Kaplinsky | |
| 4,685,076 A | 8/1987 | Yoshida et al. | |
| 4,817,140 A | 3/1989 | Chandra et al. | |
| 4,888,679 A | 12/1989 | Fossum et al. | |
| 4,897,783 A | 1/1990 | Nay | |
| 5,027,272 A | 6/1991 | Samuels | |
| 5,097,437 A | 3/1992 | Larson | |
| 5,109,499 A | 4/1992 | Inagami et al. | |
| 5,117,487 A | 5/1992 | Nagata | |
| 5,202,969 A | 4/1993 | Sato et al. | |
| 5,222,224 A | 6/1993 | Flynn et al. | |
| 5,283,886 A | 2/1994 | Nishii et al. | |
| 5,357,521 A | 10/1994 | Cheng et al. | |
| 5,513,366 A | 4/1996 | Agarwal et al. | |
| 5,598,546 A | 1/1997 | Blomgren | |
| 5,664,136 A | 9/1997 | Witt et al. | |
| 5,752,035 A | 5/1998 | Trimberger | |
| 5,838,946 A | 11/1998 | Petolino, Jr. | |
| 5,838,984 A | 11/1998 | Nguyen et al. | |
| 5,887,182 A | 3/1999 | Kinoshita et al. | |
| 5,887,183 A | 3/1999 | Agarwal et al. | |
| 5,920,721 A | 7/1999 | Hunter et al. | |
| 5,933,627 A * | 8/1999 | Parady ................ G06F 9/3851 711/122 | |
| 5,935,204 A | 8/1999 | Shimizu et al. | |
| 5,937,192 A | 8/1999 | Martin | |
| 5,941,938 A | 8/1999 | Thayer | |
| 5,999,734 A | 12/1999 | Willis et al. | |
| 6,006,319 A | 12/1999 | Takahashi et al. | |
| 6,023,755 A | 2/2000 | Casselman | |
| 6,026,479 A * | 2/2000 | Fisher ................ G06F 9/30076 712/215 | |
| 6,041,401 A | 3/2000 | Ramsey et al. | |
| 6,058,056 A | 5/2000 | Beffa et al. | |
| 6,075,546 A | 6/2000 | Hussain et al. | |
| 6,076,139 A | 6/2000 | Welker et al. | |
| 6,076,152 A | 6/2000 | Huppenthal et al. | |
| 6,097,402 A | 8/2000 | Case et al. | |
| 6,098,169 A * | 8/2000 | Ranganathan ....... G06F 11/3466 702/182 | |
| 6,125,421 A | 9/2000 | Roy | |
| 6,154,419 A | 11/2000 | Shakkarwar | |
| 6,170,001 B1 | 1/2001 | Hinds et al. | |
| 6,175,915 B1 | 1/2001 | Cashman et al. | |
| 6,195,676 B1 | 2/2001 | Spix et al. | |
| 6,202,133 B1 | 3/2001 | Jeddeloh | |
| 6,209,067 B1 | 3/2001 | Collins et al. | |
| 6,212,544 B1 * | 4/2001 | Borkenhagen ........ G06F 9/3009 712/E9.032 | |
| 6,240,508 B1 | 5/2001 | Brown, III et al. | |
| 6,243,791 B1 | 6/2001 | Vondran, Jr. | |
| 6,308,255 B1 | 10/2001 | Gorishek et al. | |
| 6,308,323 B1 | 10/2001 | Douniwa | |
| 6,339,813 B1 | 1/2002 | Smith, III et al. | |
| 6,342,892 B1 | 1/2002 | Van Hook et al. | |
| 6,345,384 B1 | 2/2002 | Sato | |
| 6,430,103 B2 | 8/2002 | Nakayama et al. | |
| 6,434,687 B1 | 8/2002 | Huppenthal | |
| 6,470,376 B1 * | 10/2002 | Tanaka ................ G06F 9/30087 375/E7.093 | |
| 6,473,777 B1 | 10/2002 | Hendler et al. | |
| 6,473,831 B1 | 10/2002 | Schade | |
| 6,480,952 B2 | 11/2002 | Gorishek, IV et al. | |
| 6,507,894 B1 | 1/2003 | Hoshi | |
| 6,510,164 B1 | 1/2003 | Ramaswamy et al. | |
| 6,567,900 B1 | 5/2003 | Kessler | |
| 6,611,908 B2 | 8/2003 | Lentz et al. | |
| 6,665,790 B1 | 12/2003 | Glossner, III et al. | |
| 6,684,305 B1 | 1/2004 | Deneau | |
| 6,701,424 B1 | 3/2004 | Liao et al. | |
| 6,738,967 B1 | 5/2004 | Radigan | |
| 6,751,700 B2 | 6/2004 | Donoghue et al. | |
| 6,789,167 B2 | 9/2004 | Naffziger | |
| 6,831,979 B2 | 12/2004 | Callum | |
| 6,839,828 B2 | 1/2005 | Gschwind et al. | |
| 6,868,472 B1 | 3/2005 | Miyake et al. | |
| 6,891,543 B2 | 5/2005 | Wyatt | |
| 6,948,158 B2 | 9/2005 | Van Gageldonk et al. | |
| 6,954,845 B2 | 10/2005 | Arnold et al. | |
| 6,978,451 B2 | 12/2005 | Heeb | |
| 6,983,456 B2 | 1/2006 | Poznanovic et al. | |
| 7,000,211 B2 | 2/2006 | Arnold | |
| 7,028,286 B2 | 4/2006 | Larin et al. | |
| 7,065,631 B2 | 6/2006 | Weaver | |
| 7,120,755 B2 | 10/2006 | Jamil et al. | |
| 7,149,867 B2 | 12/2006 | Poznanovic et al. | |
| 7,167,971 B2 | 1/2007 | Asaad et al. | |
| 7,225,324 B2 | 5/2007 | Huppenthal et al. | |
| 7,228,531 B1 | 6/2007 | Langhammer | |
| 7,237,088 B2 * | 6/2007 | Barry ................ G06F 9/30043 712/15 | |
| 7,257,757 B2 | 8/2007 | Chun et al. | |
| 7,278,122 B2 | 10/2007 | Willis | |
| 7,313,673 B2 * | 12/2007 | Abernathy .......... G06F 9/30079 712/214 | |
| 7,328,195 B2 | 2/2008 | Willis | |
| 7,360,060 B2 | 4/2008 | Chauvel et al. | |
| 7,367,021 B2 | 4/2008 | Ansari et al. | |
| 7,376,812 B1 | 5/2008 | Sanghavi et al. | |
| 7,418,571 B2 | 8/2008 | Wolrich et al. | |
| 7,421,565 B1 | 9/2008 | Kohn | |
| 7,434,029 B2 | 10/2008 | Chauvel et al. | |
| 7,506,325 B2 | 3/2009 | Brokenshire et al. | |
| 7,543,282 B2 | 6/2009 | Chou | |
| 7,546,441 B1 | 6/2009 | Ansari et al. | |
| 7,577,822 B2 | 8/2009 | Vorbach | |
| 7,643,353 B1 | 1/2010 | Srinivasan et al. | |
| 7,665,078 B2 | 2/2010 | Liebenow | |
| 7,886,129 B2 | 2/2011 | Hudepohl et al. | |
| 7,895,585 B2 | 2/2011 | Prakash et al. | |
| 7,904,703 B1 * | 3/2011 | Kang ................ G06F 9/3009 712/229 | |
| 8,020,169 B2 * | 9/2011 | Yamasaki ............ G06F 9/3009 712/228 | |
| 8,095,735 B2 | 1/2012 | Brewer et al. | |
| 8,095,778 B1 | 1/2012 | Golla | |
| 8,122,229 B2 | 2/2012 | Wallach et al. | |
| 8,136,102 B2 | 3/2012 | Papakipos et al. | |
| 8,154,989 B1 * | 4/2012 | Susai ................ H04L 12/437 370/216 | |
| 8,156,307 B2 | 4/2012 | Wallach et al. | |
| 8,196,127 B2 | 6/2012 | Gschwind | |
| 8,205,066 B2 | 6/2012 | Brewer et al. | |
| 8,327,325 B2 | 12/2012 | Chung et al. | |
| 8,458,629 B2 | 6/2013 | Caldwell et al. | |
| 8,972,958 B1 | 3/2015 | Brewer | |
| 9,069,553 B2 * | 6/2015 | Zaarur ................ G06F 9/4856 | |
| 9,710,384 B2 | 7/2017 | Wallach et al. | |
| 2001/0004753 A1 | 6/2001 | Dell et al. | |
| 2001/0011342 A1 | 8/2001 | Pechanek et al. | |
| 2001/0049816 A1 | 12/2001 | Rupp | |
| 2002/0046324 A1 | 4/2002 | Barroso et al. | |
| 2002/0099907 A1 | 7/2002 | Castelli et al. | |
| 2002/0100029 A1 | 7/2002 | Bowen | |
| 2002/0135583 A1 | 9/2002 | Ohba | |
| 2002/0144061 A1 | 10/2002 | Faanes et al. | |
| 2003/0005424 A1 | 1/2003 | Ansari et al. | |
| 2003/0046521 A1 * | 3/2003 | Shoemaker .......... G06F 9/3851 712/228 | |

(56) References Cited

U.S. PATENT DOCUMENTS

| | | |
|---|---|---|
| 2003/0140222 A1 | 7/2003 | Ohmi et al. |
| 2003/0226018 A1 | 12/2003 | Tardo et al. |
| 2004/0003170 A1 | 1/2004 | Gibson et al. |
| 2004/0019762 A1 | 1/2004 | Fukuoka et al. |
| 2004/0068622 A1 | 4/2004 | Van Doren et al. |
| 2004/0073780 A1* | 4/2004 | Roth ............... G06F 11/3648 712/227 |
| 2004/0088524 A1 | 5/2004 | Chauvel et al. |
| 2004/0107331 A1 | 6/2004 | Baxter |
| 2004/0117599 A1 | 6/2004 | Mittal et al. |
| 2004/0153610 A1 | 8/2004 | Chi |
| 2004/0193837 A1 | 9/2004 | Devaney et al. |
| 2004/0193852 A1 | 9/2004 | Johnson |
| 2004/0194048 A1 | 9/2004 | Arnold |
| 2004/0215898 A1 | 10/2004 | Arimilli et al. |
| 2004/0221127 A1 | 11/2004 | Ang |
| 2004/0236920 A1 | 11/2004 | Sheaffer |
| 2004/0243984 A1 | 12/2004 | Vorbach et al. |
| 2004/0250046 A1 | 12/2004 | Gonzalez et al. |
| 2004/0267970 A1 | 12/2004 | Jirgal |
| 2005/0027970 A1 | 2/2005 | Arnold et al. |
| 2005/0044539 A1 | 2/2005 | Liebenow |
| 2005/0108503 A1 | 5/2005 | Sandon et al. |
| 2005/0125754 A1 | 6/2005 | Schubert et al. |
| 2005/0149931 A1* | 7/2005 | Lin ............... G06F 9/3851 718/100 |
| 2005/0172099 A1 | 8/2005 | Lowe |
| 2005/0188368 A1 | 8/2005 | Kinney |
| 2005/0193359 A1 | 9/2005 | Gupta et al. |
| 2005/0198442 A1 | 9/2005 | Mandler |
| 2005/0223369 A1 | 10/2005 | Chun et al. |
| 2005/0262278 A1 | 11/2005 | Schmidt |
| 2006/0075060 A1 | 4/2006 | Clark |
| 2006/0095901 A1 | 5/2006 | Brokenshire et al. |
| 2006/0149941 A1 | 7/2006 | Colavin et al. |
| 2006/0259737 A1 | 11/2006 | Sachs et al. |
| 2006/0288191 A1 | 12/2006 | Asaad et al. |
| 2007/0005881 A1 | 1/2007 | Garney |
| 2007/0005932 A1 | 1/2007 | Covelli et al. |
| 2007/0038843 A1 | 2/2007 | Trivedi et al. |
| 2007/0106833 A1 | 5/2007 | Rankin et al. |
| 2007/0130445 A1 | 6/2007 | Lau et al. |
| 2007/0153907 A1 | 7/2007 | Mehta et al. |
| 2007/0157166 A1 | 7/2007 | Stevens |
| 2007/0186210 A1 | 8/2007 | Hussain et al. |
| 2007/0204107 A1 | 8/2007 | Greenfield et al. |
| 2007/0226424 A1 | 9/2007 | Clark et al. |
| 2007/0245097 A1 | 10/2007 | Gschwind et al. |
| 2007/0283336 A1 | 12/2007 | Gschwind et al. |
| 2007/0288701 A1 | 12/2007 | Hofstee et al. |
| 2007/0294666 A1 | 12/2007 | Papakipos et al. |
| 2008/0059758 A1 | 3/2008 | Sachs |
| 2008/0059759 A1 | 3/2008 | Sachs |
| 2008/0059760 A1 | 3/2008 | Sachs |
| 2008/0104365 A1 | 5/2008 | Kohno et al. |
| 2008/0115113 A1* | 5/2008 | Codrescu ............ G06F 9/3005 717/127 |
| 2008/0177996 A1 | 7/2008 | Simar et al. |
| 2008/0209127 A1 | 8/2008 | Brokenshire et al. |
| 2008/0215854 A1 | 9/2008 | Asaad et al. |
| 2009/0064095 A1 | 3/2009 | Wallach et al. |
| 2009/0144690 A1 | 6/2009 | Spackman et al. |
| 2009/0172364 A1 | 7/2009 | Sprangle et al. |
| 2009/0177843 A1 | 7/2009 | Wallach et al. |
| 2009/0219779 A1 | 9/2009 | Mao et al. |
| 2010/0002572 A1 | 1/2010 | Garrett |
| 2010/0036997 A1 | 2/2010 | Brewer et al. |
| 2010/0070516 A1 | 3/2010 | Adler |
| 2010/0131934 A1 | 5/2010 | Kim et al. |
| 2010/0138587 A1 | 6/2010 | Hutson |
| 2011/0055516 A1 | 3/2011 | Willis |
| 2011/0225394 A1* | 9/2011 | Mital ............... G06F 9/3851 712/205 |
| 2011/0276787 A1* | 11/2011 | Koga ............... G06F 8/45 712/215 |
| 2012/0036514 A1 | 2/2012 | Master et al. |
| 2012/0042121 A1 | 2/2012 | Kim et al. |
| 2012/0131309 A1 | 5/2012 | Johnson et al. |
| 2012/0144396 A1* | 6/2012 | Bohrer ............ G06F 9/4843 718/103 |
| 2012/0192163 A1 | 7/2012 | Glendenning et al. |
| 2012/0284489 A1* | 11/2012 | Plondke ............ G06F 9/30167 712/226 |
| 2013/0111426 A1 | 5/2013 | Durbha et al. |
| 2013/0304994 A1* | 11/2013 | Koob ............ G06F 12/0842 711/129 |

OTHER PUBLICATIONS

Alverson et al., "The Tera Computer System", Tera Computer Company, Seattle Washington USA, pp. 1-6.
Bekerman et al., "Performance and Hardware Complexity Tradeoffs in Designing Multithreaded Architectures", 1089-795X/96$5.00 © 1996 IEEE, Proceedings of PACT '96, pp. 24-34.
Tumeo et al., "Designing Next-Generation Massively Multithreaded Architectures for Irregular Applications", Pacific Northwes National Laborator, Computer, Published by the IEEE Computer Society, 0018-9162/12/$31.00 © 2012 IEEE, Aug. 2012, pp. 42-50.
Cray XD1™ FPGA Development, Release 1.2; S-6400-12, issued Apr. 18, 2005. Available at www.eng.uah.edu/~jacksoa/CrayXD1FPGADevelopment.pdf.
A. E. Eichenberger, et al., "Using Advanced Compiler Technology to Exploit the Performance of the Cell Broadband Engine™ Architecture," IBM Systems Journal, vol. 45, No. 1, 2006.
Andreas Koch et al., "A Universal Co-Processor for Workstations", 1994, Abingdon EE&CS Books, 14 pgs.
Arnold, Jeffrey M., "The Splash 2 Processor and Applications", 1993 IEEE, pp. 482-485.
Belgard, Rich, "Reconfigurable Illogic", Microprocessor, The Insider's Guide to Microprocessor Hardware, May 10, 2004, 4 pgs.
Bosky Agarwal, "Instruction Fetch Execute Cycle," CS 518 Fall 2004. pp. 1-10.
Gerald Estrin, "Organization of Computer Systems—The Fixed Plus Variable Structure Computer", 1960.
Gokhale, Maya, "Reconfigurable Computing", Accelerating Computation with Field-Programmable Gate Arrays, © Springer, pp. 4 and 60-64.
Gokhale, Maya; "Heterogeneous Processing", Los Alamos Computer Science Institute LACSI 2006, Oct. 17-19, 2006, Santa Fe, NM. Available at wvvw.cct.lsu.edu/~estrabd/LACSI2006/workshops/workshop5/gokhale_mccormick.pdf.
Hauck, S. "The Roles of FPGAs in Reprogrammable Systems", Proceedings fo the IEEE, vol. 86, No. 4, 615-638, Apr. 1998.
International Search Report and Written Opinion issued for PCT/US08/73423 dated Nov. 12, 2008, 12 pgs.
International Search Report and Written Opinion issued for PCT/US08/74566 dated Nov. 14, 2008, 9 pgs.
International Search Report and Written Opinion issued for PCT/US08/75828 dated Nov. 18, 2008, 12 pgs.
International Search Report and Written Opinion issued for PCT/US08/87233, dated Feb. 5, 2009, 11 pgs.
International Search Report and Written Opinion issued for PCT/US09/60811, dated Dec. 1, 2009, 7 pgs.
International Search Report and Written Opinion issued for PCT/US09/60820, dated Dec. 9, 2009, 8 pgs.
L.N. Bhuyan, "Lecture 15: Symmetric Multiprocessor: Cache Protocols", Feb. 28, 2001, 16 pgs.
Levine et al., "Efficient Application Representation for HASTE: Hybrid Architectures with a Single, Transformable Executable", 2003, 10 pgs.
Page, I., "Reconfigurable Processor Architectures", Microprocessors and Microsystems, vol. 20, Issue 3 May 1996, pp. 185-196.
Poster entitled GigaScale Mixed-Signal System Verification, FTL Systems, Inc. presented at the DARPA/MTO Team/NeoCAD2003 Fall Review, Sep. 15-17, 2003, Monterey, CA, a public unclassified meeting.

(56) References Cited

OTHER PUBLICATIONS

Poster entitled StarStream™ GigaScale Mixed-Signal System Verification, FTL Systems, Inc. presented at the DARPA/MTO Team/NeoCAD Program Review, Feb. 23, 2004, Scottsdale, AZ, Monterey, CA, a public unclassified meeting.
Shirazi et al., "Run-Time Management of Dynamically Reconfigurable Designs", Field-Programmable Logic and Applications from FPGAs to Computing Paradigm, 1998.
Siewiorek, Daniel P.; Bell, Gordon C.; Newell, Allen; "Computer Structures: Principles and Examples" McGraw-Hill, 1982, p. 334, Figure 1(a).
StarStream Design Summary; FTL Systems, Inc., available at Design Automation Conference (DAC), Jun. 13-17, 2005, Anaheim, CA.
The Cell Project At IBM Research, "Heterogeneous Chip Multiprocessing," http://www.research.ibm.com/cell/heterogeneousCMP.html.
The Cell Project at IBM Research, "The Cell Synergistic Processor Unit," http://www.research.ibm.com/cell/SPU.html.
The PC Guide, "The PC's x86 Instruction Set", 2004, www.pcguide.com/ref/cup.arch/int/instX86-c.html, 3 pgs.
Trednnick, Nick et al., "Microprocessor Sunset", Microprocessor, The Insider's Guide to Microprocessor Hardware, May 3, 2004, 4 pgs.
Vassiliadis et al., "The ARISE Reconfigurable Instruction Set Extension Framework", Jul. 16, 2007.
XESS Corporation,"XSA Board V1.1, V1.2 User Manual" (Release Date: Jun. 23, 2005).
XESS, "XSA-50 Spartan-2 Prototyping Board with 2.5V, 50,000-gate FPGA" (copyright 1998-2008).
Callahan, Timothy J.; Hauser, John R.; Wawrzynek, John; "The Garp Architecture and C Compiler", IEEE Computer, vol. 33, No. 4, pp. 62-69, Apr. 2000.
FreeBSD, "Manual Reference Pages—A.OUT (5)", Jun. 5, 1993, 6 pgs.
Kumar et al. Single-ISA heterogeneous multi-core architectures: the potential for processor power reduction, 36th Annual IEEE/ACM International Symposium on Microarchitecture 2003, Dec. 2003, pp. 81-92, Retrieved on [Jun. 7, 2003] Retrieved from the Internet: URL<http://ieeexplore.ieee.org/stamp/stamp.jsp?tp=&arnumber=1253185>.
Fidanci et al.Performance and overhead in a hybrid reconfigurable computer, Proceedings. International Parallel and Distributed Processing Symposium 2003, Apr. 2003, Retrieved on [Jun. 7, 2013], Retrieved from the Internet: URL<http://ieeexplore.ieee.org/stamp.jsp?tp=&arnumber=1213325>.
International Search Report and Written Opinion issued for PCT/US2009/051096, dated Oct. 29, 2009, 9 pp.
Keswani, R., "Computational Model for Re-entrant Multiple Hardware Threads," Electronics and Communication Engineerting, Osmania University, Hyderabad, India, 2002, 87 pages.
Hauck et al., "Sotware Technologies for Reconfigurable Systems," Northwestern University, Dept. of ECE, Technical Report, 1996, 40 pages.
Leidel et al., "CHOMP: A Framework and Instruction Set for Latency Tolerant, Massively Multithreaded Processors," Convey Computer Corporation, Richardson, Texas, 12 pages.
Bombieri, N., "HIFSuite: Tools for HDL Code Conversion and Manipulation," Dec. 1, 2009, Accepted Oct. 12, 2010, Hindawi Publishing Corporation.
International Search Report and Written Opinion issued for PCT/US2013/042439, dated Dec. 16, 2013, 10 pages.

* cited by examiner

SYSTEMS AND METHODS FOR SELECTIVELY CONTROLLING MULTITHREADED EXECUTION OF EXECUTABLE CODE SEGMENTS

CROSS-REFERENCE TO RELATED APPLICATIONS

The present application claims priority to U.S. Provisional Patent Application No. 61/656,829, entitled "CHOMP: A FRAMEWORK AND INSTRUCTION SET FOR LATENCY TOLERANT, MASSIVELY MULTI-THREADED PROCESSORS", filed Jun. 7, 2012, and is related to U.S. patent application Ser. No. 11/969,792 entitled "MICROPROCESSOR ARCHITECTURE HAVING ALTERNATIVE MEMORY ACCESS PATHS," filed Jan. 4, 2008, and U.S. patent application Ser. No. 13/658,617, entitled "MULTISTAGE DEVELOPMENT WORKFLOW FOR GENERATING A CUSTOM INSTRUCTION SET RECONFIGURABLE PROCESSOR," filed Oct. 23, 2012, the disclosures of which are hereby incorporated herein by reference.

TECHNICAL FIELD

The invention relates generally to multithreaded computing and, more particularly, to techniques for efficient scheduling of concurrent applications in multithreaded processors.

BACKGROUND OF THE INVENTION

The recent advent of the multicore era, wherein a single computing component with two or more independent actual central processing units (called "cores") which read and execute program instructions, has refocused much of the hardware and software development activities on optimizing data cache locality and concurrency. Application performance is no longer gated solely by the core arithmetic unit performance. Rather, data locality, memory bandwidth, and concurrent execution are becoming primary metrics for potential performance increases. As data caches and core density continue to grow alongside transistor density, memory bandwidth has failed to grow at comparable rates. As a result, applications are increasingly forced to remain data cache aware when executing concurrently in order to reduce pressure on main memory. Many applications and kernels access memory in non-unit stride or irregular patterns making data cache locality difficult to achieve.

Traditional microprocessor designs are developed from the perspective of a given function pipe, resulting in the core being very myopic in focus whereby the operation of the core only considers the instructions and the cache mechanisms the core has access to and makes very little consideration regarding memory. In operation, when the core is presented with a long latency event (e.g., loading values from main memory) a significant amount of processing time is consumed (e.g., loading values from main memory is considerably slower than loading values from cache memory) and the function unit has very little ability to either predict that or do anything to mitigate the effects of the delay. In that period of time that the core is waiting for completion of the long latency event, the core is basically doing nothing or "stalling". However, power utilization and processing performance are often important in processor-based system implementations. For example, power utilization is particularly important with respect to mobile applications, where during the aforementioned stalling the system is consuming power, and thus draining the battery. In the case of high performance computing, the aforementioned stalling wastes processor cycles, whereas high performance computing should make the most efficient use of every single possible clock cycle within a given processor core.

Efficient application concurrency can dramatically affect overall performance. For example, application concurrency may be utilized in multicore processor platforms to provide increased performance. Concurrency is the notion of multiple things happening at the same time, thus in implementations of application concurrency a plurality of applications or instructions thereof are performed in parallel by one or more processing units of the processor platform. When implemented on a single processor, multithreading generally occurs by time-division multiplexing (e.g., "multitasking"), wherein the processing unit switches between different threads (a program section, such as the smallest sequence of programmed instructions that can be managed independently by an operating system scheduler, declared to be a thread for execution by a processing unit). This context switching (i.e., switching between the threads executed by a processing unit) generally happens frequently enough that the user perceives the threads or tasks as running at the same time. When implemented on multiple processors (e.g., processing units of a multi-core system), the threads or tasks will actually run at the same time, with each processor unit running a particular thread or task. Such application concurrency may have a dramatic effect on overall performance, especially when the target applications access memory in irregular or non-unit stride patterns.

Introducing concurrency to an application typically involves the creation of one or more additional threads. Unfortunately, writing threaded code is challenging. Threads are low-level constructs that typically must be managed manually. The optimal number of threads for an application can change dynamically based on the current system load and the underlying hardware. Thus, implementing a correct threading solution can become extremely difficult. Moreover, the synchronization mechanisms typically used with threads add complexity and risk to software designs without any guarantees of improved performance. Accordingly, the implementation of efficient application concurrency in order to effectively affect overall performance presents challenges with respect to scheduling and controlling the multiplexing or use of multiple threads, with the object being to have each core performing processing functions on every clock cycle.

As memory hierarchies become increasingly complex and core density increasingly large, the pressures of effectively utilizing the operating system and software runtime scheduling mechanisms become exponentially more difficult to manage. Furthermore, few modern architectures and instruction sets provide adequate control over when and how thread and task concurrency is enforced. Application concurrency as implemented in the past largely relies on software runtime libraries and operating system scheduling paradigms.

For example, one common multithreading implementation implements periodic thread switching (referred to as simultaneous multithreading (SMT)) in which instructions from multiple threads are fetched, executed and retired on each cycle, sharing most of the resources in the core. Accordingly, the processing units of a SMT multithreading multicore platform implement periodic context switching (referred to herein as hardware interleaved context switching), whereby the processing units (e.g., cores of a multicore system) implementing multiple threads issue an instruction from a different thread every predetermined period (e.g., every cycle or every X cycles), as defined by the hardware configuration. That is, hardware interleaved context switching implements fixed time-based context switching where a predetermined, fixed time period is provided for executing each thread before switching to execution of a next thread. The periodicity of the hardware interleaved context switching is established a priori, without knowledge of the particular threads or the functionality being performed and without the ability of a the system or a user (e.g., a programmer) changing the switching period. Although such periodic thread switching may result in the core performing processing functions during most if not all (e.g., in the case of context switching on every cycle) clock cycles, the processing efficiency is often less than optimum due, for example, to the context switching being independent of the particular operations being performed.

Alternatively, common multithreading implementations implement event-based context switching (referred to as switch on event (SOE)) based multithreading in which instructions from a single thread are fetched, executed and retired while particular events (e.g., long latency memory operation events) are used to initiate switching between the different threads. Accordingly, the processing units of a SOE multithreading multicore platform implement SOE context switching, whereby the processing units implementing multiple threads issue an instruction from a different thread upon certain predefined events, as defined in the operating system and/or hardware configuration. That is, SOE context switching implements event based switching where the events are predetermined, usually very simplistic, and defined in the hardware implementation. The particular events for which context switching is provided are determined a priori, without knowledge of the actual way in which the system is being utilized or how the particular functions are being implemented. Such event based thread switching can result in less than optimum processor efficiency due to their being additional events which, in the context of the particular operation of the system, may result in long latencies, the particular events for which event based thread switching is provided may, in the context of the particular operation of the system, may not result in long latencies, etc.

In an attempt to provide increased performance in a multicore environment where data locality, memory bandwidth, and concurrent execution are the primary metrics for potential performance increases, several platforms have utilized data cache-less processor architectures coupled with novel memory systems in order to explore or optimize performance for applications and kernels without sufficient memory locality. For example, the Cray XMT combines the interconnect technology found in the Cray XT3 series of supercomputers with the processor originally designed for the Tera MTA. The Cray XMT is a distributed shared memory (DSM) system in which the globally shared address space is uniformly scrambled at very fine granularity on the different node memories. Rather than utilizing large memory request payloads, the Cray XMT relies on small messages and fine-grain thread parallelism to hide latencies to main memory and prevent arithmetic unit stalls. Each multithreaded barrel processor consists of the core processor logic, a DDR memory controller, HyperTransport chip interconnect logic and a switch that interconnects the aforementioned components. The core processor logic consists of 128 hardware streams, each of which is only permitted to have a single instruction in the pipeline at any given time. However, the Cray XMT requires a unique programming environment and compiler that is specifically crafted to expose sufficient parallelism in order to efficiently utilize the underlying hardware. Moreover, each node integrates a custom processing unit that switches context among numerous hardware threads on a cycle-by-cycle basis, as defined by the hardware configuration thereof (i.e., hardware interleaved context switching). Although the Cray XMT implementation of hardware interleaved context switching may result in improved performance with respect to the processing of the various threads (i.e., the parallel processing), as the threads of a particular application are brought together at the end of their processing the performance suffers due to the hardware interleaved context switching. That is, as the plurality of threads come together and serial processing of the application is performed, the cycle-by-cycle thread switching is performed extremely slow (e.g., the Cray XMT supports 128 threads, and thus the aforementioned serial processing receives $1/128^{th}$ of the clock cycles).

Another example of a multicore platform developed to provide increased performance is the IBM CYCLOPS-64 system. The IBM CYCLOPS-64 architecture is built upon the notion of building a multiprocessor-on-chip using a large number of lightweight cores. In particular, the CYCLOPS-64 design includes 75 processors, each with two thread units and two 32 KB SRAM memory banks. No data caches are included on chip. However, each SRAM bank can be configured as a small scratchpad memory. The remaining portions of SRAM are grouped together to form a global memory that is uniformly addressable from all thread units. Unlike the Cray XMT, however, the programming model for the CYCLOPS-64 does not require platform-specific semantics. Rather, commodity parallel programming constructs such as OpenMP, a parallel programming API for shared-memory parallel programming, are utilized for parallelizing applications for the platform. In a further difference from the Cray XMT, the CYCLOPS-64 architecture provides a SOE multithreading multicore platform in which the processing units thereof implement SOE context switching, as defined in the CYCLOPS-64 hardware configuration.

Still another example of a multicore platform developed to provide increased performance is the Sun ULTRASPARK T2 system. The ULTRASPARK T2 architecture shares many features with the above described systems. Each ULTRASPARK T2 processor (codenamed Niagara2) contains eight SPARC cores. Each core supports the current execution of up to eight threads. In this manner, the Niagara2 processor is a chip-multithreading (CMT) architecture. The Niagara2 architecture also includes four memory controllers, two 10 Gb Ethernet controllers and a x8 PCI-Express channel on chip. In contrast to the above described systems, the ULTRASPARK T2 architecture includes explicit data caches. The eight SPARC cores support up to 64 concurrent threads sharing a 4 MB Level2 cache, which is divided into eight banks of 512 KB each. Fair cache sharing between multiple co-scheduled threads, however, has been shown to be a potential cause of serious problems such as threads starvation. Cache sharing can be extremely unfair, for example, when a thread with high miss rate and poor locality constantly causes evictions of other thread's data that will be required soon after. Moreover, as with the Cray XMT system, the SPARC cores in the ULTRASPARK T2 architecture employ a form of interleaved multithreading whereby the processing units switch context among numerous hardware threads on a cycle-by-cycle basis, as defined by the hardware configuration thereof (i.e., hardware interleaved context switching).

Such architectures and their associated instruction sets fail to provide efficient support for fine-grain application concurrency. Moreover, the user is provided no control over the scheduling of the threads, and instead the scheduling mechanisms, are established a priori in the hardware implementations. In particular, the thread scheduling implemented by the prior multithreading systems is part of the hardware implementation, and thus is fixed and not subject to subsequent modification or dynamic control.

BRIEF SUMMARY OF THE INVENTION

The present invention is directed to systems and methods which provide a modular processor framework and instruction set architecture designed to efficiently execute applications whose memory access patterns are irregular or non-unit stride. A hybrid multithreading framework (HMTF), embodiments of which are referred to as the Convey Hybrid OpenMP (CHOMP™) processor framework, is designed to allow hardware architects to selectively build massively multithreaded processors without redesigning each individual hardware module. This modular approach allows the processor architect to easily add user-defined arithmetic functionality not present in the base hardware framework and instruction set. Furthermore, the HMTF architecture of embodiments contains unique power gating features that are easily accessible from user and runtime code space in order to make most efficient use of core power on chip, such as to allow application-level, dynamic power gating of individual register files and function pipes.

A HMTF implemented according to embodiments of the invention provides a framework for constructing tightly coupled, chip-multithreading (CMT) processors that contain specific features well-suited to hiding latency to main memory and executing highly concurrent applications. The framework may, for example, be built around a RISC instruction set that permits the hardware and software runtime mechanisms to participate in efficient scheduling of concurrent application workloads regardless of the distribution and type of instructions utilized. In this manner, all instructions in embodiments of a HMTF instruction set have the ability to participate in the concurrency algorithms present in the hardware scheduler that drive context switch events. This, coupled with a set of hardware supported extended memory semantics instructions, means that a HMTF architecture of embodiments is well suited to executing applications that access memory using non-unit stride or irregular access patterns.

The HMTF of embodiments includes an instruction set designed specifically to exploit the high degree of parallelism and concurrency control mechanisms present in the HMTF hardware modules. This instruction set and associated compiler tools are designed to allow high-level parallel programming constructs to make efficient use of on-chip parallelism. Common MIMD programming techniques such as thread-local storage, thread identification, resource sharing and overlapping computation are natively built into the HMTF instruction set of embodiments with explicit hardware support.

The instruction format implemented by a HMTF of embodiments of the invention is designed to give the architecture, the runtime libraries, and/or the application ultimate control over how and when concurrency between thread cache units is initiated. For example, one or more bit of the instruction payload may be designated as a context switch bit (CTX) for expressly controlling context switching. In operation, when set to a predetermined value, the context switch bit informs the hardware scheduling mechanisms that the respective thread cache unit is preparing to embark on a long latency event. Accordingly, the hardware scheduling mechanisms of embodiments will subsequently begin to search for other candidate thread cache units to take its place in the current context frame. The foregoing operation is preferably performed very early in the instruction pipeline and thus many context switch operations are single cycle events. The utilization of context switch bits according to embodiments of the invention provides the ability to expressly control the application concurrency on a cycle-by-cycle granular level. Accordingly, embodiments provide control to the thread scheduling and context switching to users, programmers, and/or compliers to implement thread switching for any period, event, or condition determined useful with respect to the actual way in which the system is being utilized and/or how the particular functions are being implemented.

As can be appreciated from the foregoing, the HMTF architecture and instruction set of embodiments of the invention provides architects and users the ability to rapidly develop massively multithreaded processors and tightly coupled parallel programming paradigms that execute efficiently with high degrees of parallelism.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Embodiments of the invention provide a hybrid multithreading framework (HMTF) in a multicore environment where data locality, memory bandwidth, and concurrent execution are metrics driving the processing efficiency. A HMTF implemented according to embodiments of the invention provides a framework for constructing tightly coupled, chip-multithreading (CMT) processors that contain specific features well-suited to hiding latency to main memory and executing highly concurrent applications. A modular processor framework and instruction set architecture are provided by HMTF embodiments herein designed to efficiently execute applications whose memory access patterns are irregular or non-unit stride. In operation according to embodiments, all instructions of a HMTF have the ability to participate in the concurrency algorithms present in a hardware scheduler that drive context switch events, as discussed in detail below.

To facilitate an understanding of the concepts herein, a brief description of exemplary configurations of multicore platforms with which a HMTF of embodiments of the invention may be implemented are provided below. Specifically, exemplary hardware configurations (e.g., coprocessor and memory architectures) and software configurations (e.g., operating system and kernel) are described. Likewise, exemplary compiler configurations as may be utilized in implementing a HMTF of embodiments of the invention are provided below to facilitate a full understanding of the concepts herein. It should be appreciated that the configurations given are merely examples and are not limiting with respect to the application of the invention herein.

HMTF Coprocessor Architecture

Figure 1:
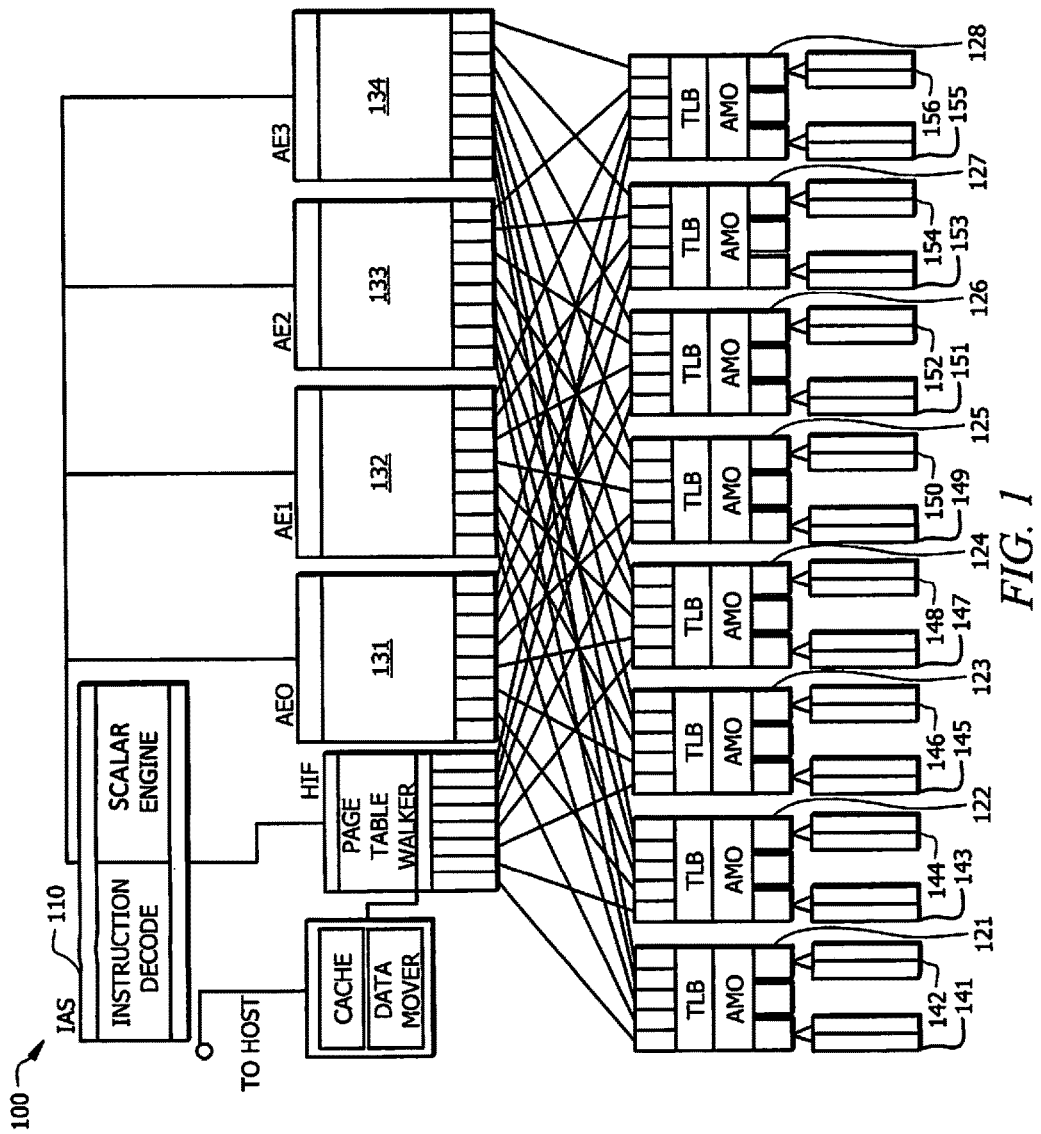
FIG. 1 shows a high level block diagram of a coprocessor architecture implementing a hybrid multithreading framework of embodiments of the invention.

A HMTF of embodiments herein is implemented with respect to a multicore platform comprising a single computing component with two or more independent processing units which read and execute program instructions. For example, a HMTF may be implemented with respect to homogeneous computing platforms (i.e., a multicore platform in which the multiple processing units are the same) and/or heterogeneous computing platforms (i.e., a multicore platform in which ones of the multiple processing units are different). An example of a heterogeneous computing platform adapted to implement a HMTF according to embodiments of the invention is the MX-100 hybrid core architecture developed by Convey Computer Corporation, Richardson, Tex. (the assignee of the present patent application), the coprocessor architecture of which is shown in FIG. 1 as system 100. Additional detail with respect to configurations of heterogeneous multicore platforms is provided in the above referenced patent application entitled "MICROPROCESSOR ARCHITECTURE HAVING ALTERNATIVE MEMORY ACCESS PATHS."

The Convey MX-100 is known as a heterogeneous computing platform as it combines traditional Intel x86_64 processors and a coprocessor that employs field programmable gate arrays (FPGAs). The Convey series of heterogeneous platforms extends the Intel x86_64 instruction set architecture with specially constructed instruction sets that are dynamically loaded on the coprocessor FPGAs. The target instruction sets are designed for specific application domains or kernels. The MX-100 contains the third generation of coprocessor boards from Convey.

The Convey MX-100 system is constructed using the latest two-socket or four-socket Intel host motherboard. The Intel processors utilized in the host platform are Intel E5-2600 series parts based on the Intel QuickPath bus architecture. The Convey MX-100 coprocessor board is interconnected with the host system via a PCI-Express Gen 2.0 eight-lane bus. The host platform contains a PCI-Express cable adapter that extends the board-level bus to the external coprocessor chassis.

The Convey MX-100 coprocessor board is constructed using a series of fourteen FPGAs and thirty-two memory DIMMs. Two FPGAs host the host-to-coprocessor interconnect functions as well as the coprocessor canonical instruction set (IAS), shown as IAS 110 in FIG. 1. The IAS canonical instruction is common and serves as the basis for all coprocessor instruction sets. Eight Xilinx Virtex-6 LX-365T make up the memory controller FPGAs, shown as memory controllers 121-128 in FIG. 1. Four Xilinx Virtex-6 HX-565T components make up a series of FPGAs designated as application engines (AEs), shown as AEs 131-134 in FIG. 1. Despite the generous use of FPGAs throughout the coprocessor board architecture, the AEs are the only user-visible, reconfigurable components in the system. In this manner, the AEs host the FPGA bit files containing the user-specified instruction set architectures designated for targeted applications.

Each of the eight memory controllers is connected via a series of high-speed transceiver links to each of the AEs and the scalar IAS unit. In this manner, the coprocessor memory subsystem is a fully connected crossbar with support for up to 32,768 outstanding memory requests and 128 GB/s of aggregate bandwidth. The coprocessor memory controllers are theoretically capable of addressing up to four terabytes of scatter-gather coprocessor memory.

It should be appreciated that, although the Convey MX-100 multicore architecture has been described above in order to provide detail useful in understanding the concepts of the present invention, application of the inventive concepts are not limited to the use of any particular multicore architecture. Accordingly, one of ordinary skill in the art should readily appreciated that a HMTF of embodiments of the invention may be implemented with respect to any number of multicore architectures which may be adapted in accordance with the concepts herein.

HMTF Memory Architecture

A HMTF of embodiments herein is implemented without the use of a data cache (i.e., distinguished from an instruction cache in that a data cache stores data upon which an instruction is performed or operates) for the threads, thereby avoiding the fairness issues associated with shared data caches. However, all host and coprocessor memory is preferably shared. As such, the host can read and write to all coprocessor memory and the coprocessors can read and write all host memory according to embodiments.

Continuing with the foregoing exemplary Convey MX-100 multicore platform utilized according to embodiments of the invention, the memory system in the Convey MX-100 can be thought of as a traditional NUMA memory. Each socket on the host system has an attached set of DDR3 memory DIMMs, shown as DIMMs 141-156 in FIG. 1). Each of the eight memory controllers on the coprocessor board has an attached set of four DDR3 Scatter-Gather DIMMs. All host and coprocessor memory is shared and virtually addressable. As such, the host can read and write to all coprocessor memory and the AEs can read and write all x86_64 host memory.

There are, however, several novel differences between the host and coprocessor memory present in the Convey MX-100. First, the coprocessor memory is constructed using memory DIMMs that are optimized for scatter-gather accesses. This enables the coprocessor AEs to read and write individual eight-byte memory payloads per request. This feature is especially helpful for applications whose memory access patterns are of a non-unit stride or irregular in nature. However, the memory controllers still deliver sixty-four byte payloads when the requests are sent from the x86_64 host processors. The host accesses the coprocessor memory using the same cache line patterns utilized on its native memory, as represented in the table below. Given the system-on-chip nature of the latest Intel x86_64, all memory accesses originating from the coprocessor to host memory banks must also utilize sixty-four byte cache lines.

| Source Processor | Destination Memory | Minimum Payload Size |
|---|---|---|
| Coprocessor | Coprocessor | 8-Byte |
| Coprocessor | X86_64 | 64-Byte Cacheline |
| X86_64 | Coprocessor | 64-Byte Cacheline |
| X86_64 | X86_64 | 64-Byte Cacheline |

The second novel design feature of the coprocessor memory system is the inclusion of atomic memory operations and tag-bit operations natively in the coprocessor memory controllers. When writing highly concurrent applications it is often useful to take advantage of hardware-driven read-modify-write and locking mechanisms. In this manner, the application can ensure both functional atomicity and numerical correctness without the use of latent software spin waits or kernel locking mechanisms.

The Convey MX-100 coprocessor memory controllers implement a set of atomic operations designed to perform read-modify-write operations using simple arithmetic, as represented in the table below. These operations support unsigned four and eight byte operand atomic operations similar to the Intel x86_64 architecture. However, the Intel x86_64 are implemented via full cache-line read-modify-read mechanisms. Unlike other accelerator architectures, the Convey MX-100 also supports execution of these atomic operations from the x86_64 host processors as long as the destination addresses reside in coprocessor memory.

| Instruction | Function |
|---|---|
| Add | mem = (old + data) |
| Sub | mem = (old − data) |
| Exch | mem = data |
| Min | mem = (old < data) ? old : data |
| Max | mem = (old > data) ? old : data |
| Inc | mem = (old >= data) ? 0 : (old+1) |
| Dec | mem = (old == 0 \|\| (old>data)) ? data : (old−1) |
| CAS | mem = (old == data[63:32]) ? data[31:0] : old |
| And | mem = (old & data) |
| Or | mem = (old \| data) |
| Xor | mem = (old^data) |

The Convey MX-100 coprocessor memory controllers also implement a set of tag-bit operations, as represented in the table below. These extended memory semantics are similar in function to the tag-bit operations present in the Tera MTA and Cray XMT architectures. However, each eight byte virtual address also includes an additional tag or lock bit associated with it. These tag bits provide very fined grained locking capability across the entire coprocessor memory region. When the lock bits contain zero, the associated eight bytes is marked empty or unlocked. This is the default state when the system is initially booted and immediately following a freshly allocated memory block. The associated eight bytes is locked when the tag bit contains a one, or full marker. The success of each tag bit operations is contingent upon the initial state of the tag bit when the request reaches the appropriate memory controller. Multiple operations of each type exist based upon the expected initial state and requested committed state of the operation.

| Instruction | Function |
|---|---|
| WriteEF | if (!full) {mem=data; full=1; ret(1,64'bx)} else{ ret 0, 64'bx) } |
| WriteFF | if(full) {mem=data; full=1; ret(1,0x00ll)} else { ret(0,0x00ll) } |
| WriteXF | mem = data; full = 1 |
| WriteXE | mem = data; full = 0 |
| ReadFE | if (full) {full=0; ret(1,mem)} else{ ret( 0, 0x00ll) } |
| ReadFF | if (full) {full=1; ret(1,mem)} else{ ret( 0, 0x00ll) } |
| ReadXX | ret( 1, old) |
| ReadEF | if (!full) {full=1; ret(1,mem)} else { ret(0,0x00ll) } |
| IncFF | if (full) { mem=old+data; full=1; ret(1,old)} else { ret(0,0x00ll) } |
| Purge | mem=0; full=0 |

For example, the Convey MX-100 memory controllers contain read empty-full, ReadEF, and read full-empty, ReadFE, instructions. The former reads an eight-byte operand to the specified address only if the tag-bit is empty, or zero. Prior to sending a completion signal, the tag-bit is set to full, or one. The latter instruction also performs a contingent read operation using an eight-byte operand. However, its success is dependent upon an initial full, or one, state in the tag-bit. The committed tag-bit state is empty, or zero. The tag-bit operations also require the use of an operand designated for return status. It is the responsibility of the application to check the return status of each respective tag-bit operation and execute the necessary compare and loop (or branch) operations if a retry is desired.

The lock characteristics of the Convey MX-100 system are only obeyed when the memory address in question is accessed via the tag-bit operations. Normal load and store operations are permitted to access the memory region regardless of the status of the tag bit. Unlike other accelerator architectures, the Convey MX-100 system also supports execution of these tag-bit operations from the x86_64 host processors as long as the destination addresses reside in coprocessor memory. See Table III for the full set of supported tag-bit operations.

HMTF Software Architecture

The software architecture, including the operating system and kernel, utilized with respect to a HMTF implementation of embodiments herein is preferably adapted to provide a kernel and software infrastructure which appears to users substantially as a common kernel and software infrastructure. However, the software environment implemented according to embodiments of the invention provides the ability to implicitly and/or explicitly control the allocation and locality of virtual memory regions to place the appropriate memory blocks nearest to their respective processing elements. Moreover, the software architecture of embodiments includes an instruction set designed specifically to exploit the high degree of parallelism and concurrency control mechanisms present in the HMTF hardware modules, such as through implementation of an instruction set adapted to facilitate control over how and when concurrency between thread cache units is initiated. Where a heterogeneous multicore platform is utilized, the software architecture of embodiments is adapted to permit the system to operate in a heterogeneous manner, such as to dispatch instructions not present in the respective host instruction set to a coprocessor.

Continuing with the foregoing exemplary Convey MX-100 multicore platform utilized according to embodiments of the invention, the Convey MX-100 platform has a unique software architecture that permits the system to operate fluidly in a heterogeneous manner. At the base of this software architecture lies the Convey Linux environment. Based upon the CentOS Linux distribution, the Convey Linux environment provides a common Linux kernel and software infrastructure for users and systems administrators. In this manner, the system appears very similar to a standard Linux installation. However, the Convey Linux environment and kernel plays two major roles in the system operation beyond the base CentOS Linux installation.

First, the Convey Linux environment provides the ability to implicitly and explicitly control the allocation and locality of virtual memory regions on the MX-100 platform. Traditional Linux systems provide several basic mechanisms such as malloc and alloca that functionally allocate heap and stack space, respectively. Large symmetric multiprocessor systems utilizing Linux-derived operating systems have also provided explicit tools, such as the CpuMemSets, in order to explicitly control the locality and affinity of memory blocks. The goal of such non-uniform memory access tools is to place the appropriate memory blocks nearest to their respective processing elements.

The Convey Linux environment explicitly presents two locality domains: host memory and coprocessor memory. Traditional allocation techniques, by default, allocate regions in host memory. The Convey Linux environment provides a complementary set of function interfaces that allow applications to explicitly allocate and de-allocate blocks in coprocessor memory. By default, these allocation mechanisms, referred to herein as cny_cp_malloc, also force the touching of all associated memory pages. As such, all pages are faulted in as a part of the allocation. There also exists first touch versions of the allocation mechanisms if this is the desired effect.

The kernel page table mechanisms implemented as a part of the Convey Linux environment support the allocation of large pages in coprocessor and host memory. Host memory pages are 4 KB units. Memory pages in the MX-100 coprocessor memory can be allocated in powers of two units from 4 KB to 2 MB and 64 MB. In this manner, the coprocessor memory system has the ability to scale to large capacities without undue pressure on the Linux page table system.

Once coprocessor or host memory has been allocated, the Convey Linux environment provides several mechanisms to copy or migrate blocks of data between the two physical locality domains. These migration strategies are implemented via a set of traditional function call interfaces and a set of compiler intrinsics within the Convey compiler suite. The function call interface mimics the standard Linux memcpy interface. The compiler interfaces are implemented via a set of compiler pragmas and directives that control the migration of memory blocks between memory locality domains.

The second role of the Convey Linux environment is to provide a mechanism to dispatch instructions not present in the respective Intel x86_64 instruction set. The Convey Linux environment reserves a set of command pages in a designated shared memory region that are visible and accessible from the host processor and coprocessor. When an application encounters an instruction block that is destined for the coprocessor, the kernel runtime writes a coprocessor start message to one of the predefined command page locations. The start message contains a unique identifier, or signature, associated with the requested coprocessor instruction set, the starting instruction pointer and a series of controls value arguments that control the coprocessor's operation.

The coprocessor monitors the shared memory command pages for the incoming start messages from the host environment. Once a successful start message has been received, the coprocessor loads the necessary information from the command page and marks the cache line containing the instruction as being owned by the initiating host process. At this point, the coprocessor begins executing the first instruction as directed in the incoming command page payload.

HMTF Compiler Architecture

Compiler configurations utilized in implementing a HMTF of embodiments of the invention are adapted for shared-memory parallel programming. For example, a complier used with respect to an HMTF embodiment may be adapted to compile code optimized for a parallel programming API (e.g., OpenMP) to produce multithreaded code to run in parallel on the processor units of a multicore platform. The compiler tools are preferably designed to allow high-level parallel programming constructs to make efficient use of on-chip parallelism. For example, although OpenMP provides a directive based programming model, based upon C, C++, or Fortran, which allows the insertion of pragmas or directive into the code to natively parallelize a piece of code which otherwise appears to be standard C, C++, or Fortran code and provide some end number of threads, OpenMP fails to take into account any aspects of the underlying hardware and its ability to perform any operation. Thus, utilization of OpenMP alone typically fails to make efficient use of the resulting parallelism.

C, C++, and Fortran compilers are provided for multiple instruction set architectures. For example, for certain Convey hybrid core systems preceding the Convey MX-100 system (e.g., the Convey HC-1 system), the Open64 compilers for the x86_64 instruction set were modified to create compilers that produce object code that contains both x86 instructions and coprocessor instructions. A given personality contains the canonical instructions plus additional instructions designed for a particular type of processing. Earlier Convey compilers support multiple vector personalities (instruction set architectures). By using an appropriate compiler option, code is generated for two instruction set architectures: x86_64 code for the host, and code for the targeted personality. In addition, code is created that allows processing to move to and from the coprocessor. The resulting executables are called "fat binaries" since they contain instructions for multiple instruction sets so that code can be executed on the host or on the coprocessor. The instructions comprise a code segment executable upon one or more processing units of a multicore processor-based system. Continuing again with the foregoing Convey MX-100 multicore platform utilized according to embodiments of the invention, Convey MX-100 compilers have been created that produce x86 instructions and the highly threaded instruction streams used with respect to HMTF implementations.

OpenMP is the dominant parallel programming API for shared-memory parallel programming and is one way for users to produce code to run on the Convey MX-100 coprocessor. If code that has been optimized for OpenMP is compiled with the Convey compiler -openmp option, then code for parallel execution is produced for the host processor. The same OpenMP pragma/directives are also used to enable highly threaded parallelism on the Convey MX-100 system.

Replacing the compiler option -openmp with -chomp enables the compiler to generate x86_64 code as well as code for the CHOMP™ embodiment of a HMTF personality for the Convey MX-100. Users may tell the compiler what portions of the application should run on the coprocessor. This may be accomplished by using additional compiler options or pragmas to support the coprocessor execution. For example, compiling a routine with -mcny_dual_target -chomp creates dual instruction streams and inserts tests to determine at runtime if a coprocessor is present and available. If it is, code will execute on the coprocessor, otherwise, code continues to run on the host.

More selective coprocessor execution can be enabled by bracketing the code section of interest with the "cny begin_coproc" and "cny end_coproc" pragmas. This will also insert a test to attempt to run the bracketed code on the coprocessor. For example, compiling the gather routine set forth below (gather.c:) with cnycc -c -chomp gather.c, causes the compiler to generate instructions for the host x86_64 instruction set, the CHOMP™ embodiment of a HMTF coprocessor instruction set, and tests to determine if the coprocessor is present and idle.

```
void gather (long n, long *ia, long *x, long *y)
{
  #pragma begin_coproc
     long i;
  #pragma omp parallel for
  for (i = 0; i < n; i++)
  {
     y[i] = x[ia[i]];
  }
  #pragma end_coproc
  return;
}
```

For good performance, there should be a sufficient amount of code to run on the coprocessor and the data should be located in the appropriate memory. Since the maximum bandwidth is obtained when data is located in coprocessor memory, data should be allocated there or copied/migrated from host memory.

The following table shows some compiler options and pragmas as may be implemented according to embodiments of the invention.

| Option | Command |
| --- | --- |
| -chomp | Enable generation of code for the CHOMP ™ personality using OpenMP directives/pragmas |
| -mcny_dual_target Or #pragma cny begin_coproc #pragma cny end_coproc | Generate code for host and coprocessor; insert tests to determine whether to run on the coprocessor |
| cny_cp_malloc cny_cp_free | Allocate and destroy data explicitly on the coprocessor |
| cny_cp_memcpy | Copy data to/from the coprocessor |
| #pragma cny migrate_coproc | Migrate data between host and coprocessor memory |

HMTF Modular Hardware Framework

Figure 2:
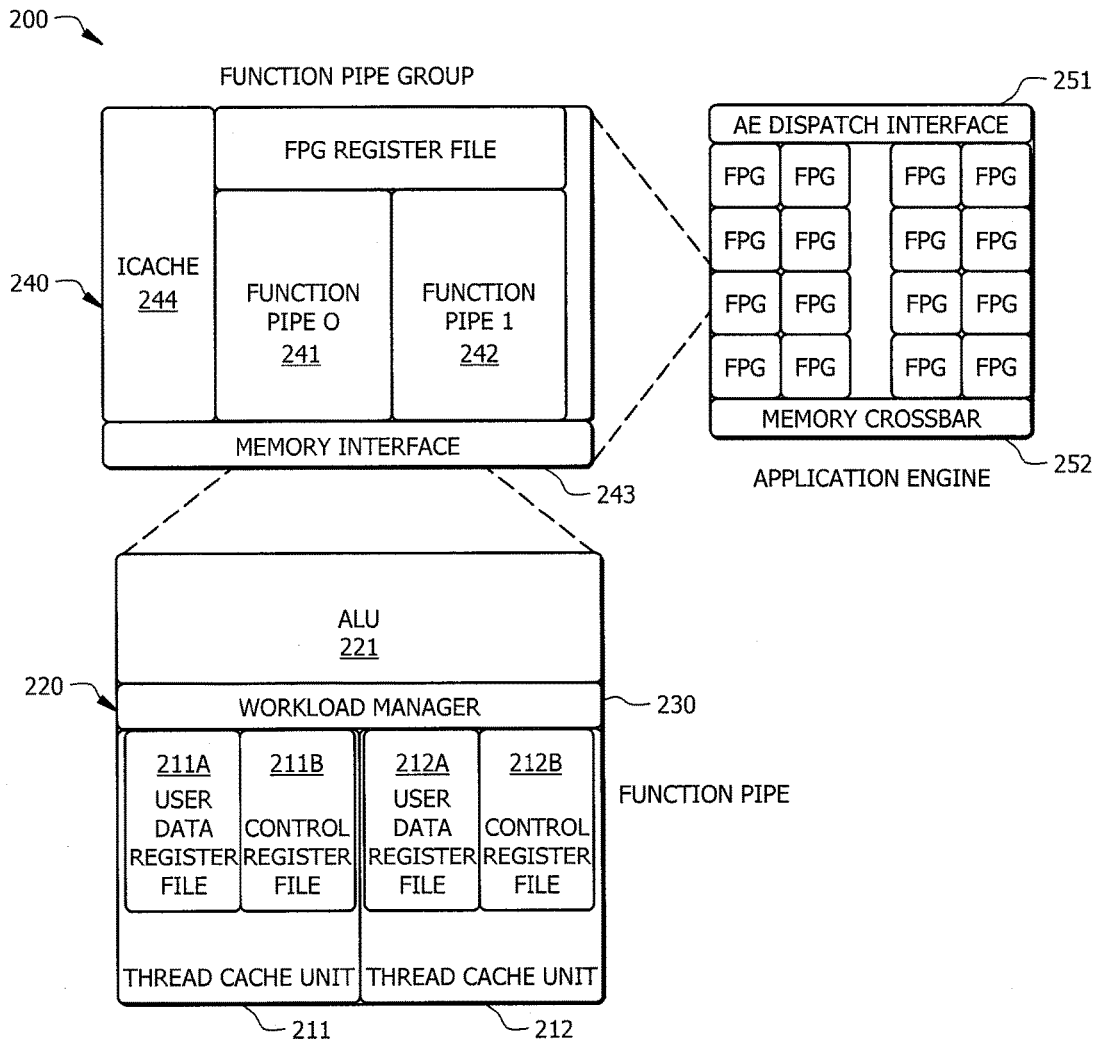
FIG. 2 shows a high level block diagram of modular hardware units for implementing a hybrid multithreading framework according to embodiments of the invention.

A HMTF implemented according to embodiments of the invention comprises a series of modular hardware units, an exemplary embodiment of which is shown as modular framework 200 in FIG. 2, built to be both flexible and extensible. Modular framework 200 of embodiments is built around a plurality of hierarchical hardware modules, shown in the illustrated embodiment as thread cache unit modules 211 and 212, function pipe module 220, workload manager module 230, function pipe group module 240, and infrastructure support modules 251 and 252. The modules of modular framework 200 of embodiments are implemented with AEs, such as AEs 131-134 of FIG. 1.

Such a modular design philosophy is utilized in order to give architects the ability to very quickly mold the framework into new HMTF-based instruction sets and immediately have digital verification, compilation and debugger support with the corresponding software tools. In this manner, an architect can very quickly modify design decisions such as the total number of hardware threads, arithmetic type support, and non-traditional instruction support without modifying the fundamental HMTF architecture. This modular approach is also utilized according to embodiments to reduce the pressures of full chip placement and routing using design tools. Local module placement and routing can be performed in a hierarchical manner in order to assist in optimal chip utilization and efficient timing closure.

HMTF Thread Cache Unit Module

Thread cache unit (TCU) modules 211 and 212 of embodiments are designed to represent individual and autonomous units of work, referred to as work units. The autonomous nature of the thread cache unit implies that no instruction level parallelism or hardware dependencies exist between it and other thread cache units according to embodiments of the invention. As such, it is up to the higher-level runtime and programming model constructs to determine how a work unit maps to a unit of parallelism. The execution associated with each thread cache unit can mapped to an autonomous parallel software construct.

In accordance with embodiments of the invention, each thread cache unit comprises a plurality of register files. For example, the illustrated embodiment of thread cache units 211 and 212 comprises a control register file (shown as control register files 211b and 212b, respectively) and a user data register file (shown as user data register files 211a and 212a, respectively).

The control register file contents may be fixed by the HMTF architecture specification. It preferably contains all the necessary registers, such as stack pointer, instruction pointer, and frame pointer, to represent any autonomous work unit. However, the control register file of embodiments also contains a plurality of user-defined performance counter registers. Such implementation specific registers can be attached to other implementation-specific functions to gather performance metrics. A list of exemplary control registers is outlined in the table below showing the register indices.

The user data register file within each thread cache unit of embodiments may contain the register set for use during normal arithmetic execution. The size of the user-data register is preferably configurable by the architect. However, the user data register file of embodiments comprises a minimum of 16 user-data registers and a maximum number of 256 user-data registers per the HMTF instruction format.

HMTF Function Pipe Module

Function pipe (FP) module 220 of embodiments of the invention comprises an arithmetic unit (shown as arithmetic/logic unit 221), a workload manager module (shown as workload manager 230), and one or more thread cache units (shown as thread cache units 211 and 212). Accordingly, the thread cache units associated with each function pipe of embodiments time-share access to the respective arithmetic unit. Each function pipe of embodiments of the invention comprises at least one thread cache unit, with a maximum of 256 thread cache units to a function pipe.

HMTF Workload Manager Module

The time-sharing context frames implemented according to embodiments of a HMTF herein are determined and controlled by a workload manager. Accordingly, workload manager module 230 of embodiments of the invention comprises the hardware logic to perform at least two main tasks. In particular, workload manager module 230 preferably comprises logic to start and stop the execution of each thread cache unit. Once initiated, the workload manager may begin searching a set of work queues in main memory for appropriate work unit execution units. When a candidate work unit is found, the workload manager of embodiments will load the state into the respective thread cache unit and mark it as a schedulable resource. Conversely, when a thread cache unit signals that it has completed its execution, the workload manager of embodiments returns the respective resources back to the runtime system.

Additionally or alternatively, the workload manager of embodiments plays a role in the scheduling of appropriate thread cache units for execution on the respective arithmetic unit. When an appropriate scheduling event occurs, the workload manager may operate to determine which thread cache unit is the best candidate to execute on the next cycle. Accordingly, hardware context switch events implemented according to embodiments herein are preferably performed in a clock cycle. The workload manager of embodiments only considers the thread cache units associated with the respective function pipe (e.g., the workload manager may have no knowledge of thread cache units elsewhere in the system). From the foregoing it can be appreciated that the workload manager of embodiments of the invention allows the HMTF infrastructure to very efficiently utilize arithmetic unit resources.

HMTF Function Pipe Group Module

Function pipe group module 240 of the illustrated embodiment of a HMTF herein contains one or more function pipes (shown as function pipes 241 and 242), a memory interface (shown as memory interface 243), and a local instruction cache (shown as ICACHE 244). The memory interface for each function pipe group preferably interfaces with the AE's main memory, such as through infrastructure support module 252 (e.g., providing a main memory crossbar module). Memory interfaces are preferably localized at the function pipe group level in order to reduce routing pressure across the FPGA components.

The function pipes within a respective function pipe group of embodiments of the invention share an instruction cache (e.g., ICACHE 244). For example, ICACHE 244 of embodiments comprises a 4-way set associative instruction cache unit with 8192 instruction slots. Each instruction slot may be 128 bits in order to encapsulate a full HMTF instruction with a bundled immediate value. The total instruction cache size according to embodiments herein is 64 KB. As such, a large number of instructions can be cached and reused by all the function pipes and associated thread cache units within the function pipe group.

HMTF Infrastructure Support Modules

The infrastructure support modules utilized according to embodiments of a HMTF implementation herein may comprise various configurations. For example, the embodiment illustrated in FIG. 2 includes AE dispatch interface infrastructure support module 251 and memory crossbar infrastructure support module 252.

AE dispatch interface infrastructure support module 251 of embodiments is utilized for a plurality of main functions. For example, the AE dispatch interface may provide an interface for an IAS unit (e.g., IAS 110 of FIG. 1) to start and stop the HMTF execution. This may be performed via a set of control registers present within the module. The AE dispatch interface of embodiments may additionally or alternatively provide an interface to the IAS unit for retrieving current state information. This state information may include the exception status or execution status of each target AE.

Memory crossbar interface infrastructure support module 252 of embodiments provides a simple, high bandwidth interface to the virtual memory system. For example, a main memory crossbar interface utilized according to embodiments may provide 16, 300 MHz ports to the HMTF infrastructure. Additionally or alternatively, a main memory crossbar interface of embodiments provides access to the virtual address space on the host system. As such, all addresses generated via HMTF instructions of embodiments are virtual.

As an example of the aforementioned hardware module interfaces, the first CHOMP™ embodiment of a HMTF personality built on the MX-100 platform is configured as follows:

64—Thread Cache Units per Function Pipe
    64—User Data Registers per Thread Cache Unit
    1—Function Pipe per Function Pipe Group
    1—Integer ALU per Function Pipe
    1—Double precision floating point ALU shared amongst 4 Function Pipes [4 per AE]
    16—Function Pipe Groups per AE
    4—Application Engines [AE]

Using the foregoing values, the total number of parallel hardware units (e.g., TCUs) of an embodiment herein can be readily determined using the following formula:

$$\text{Total TCU Count} = tcu\_per\_fp * fp\_per\_fpg * fpg\_per\_ae * 4AE = 4096$$

HMTF Instruction Set Format

The instruction set format utilized by a HMTF implementation of embodiments of the invention is designed to be both flexible and simple. For example, the instruction set format may be RISC in design, similar in nature to the original MIPS instruction set design. The instruction set of a HMTF implementation may, for example, contain a single format specification.

Figure 3A:
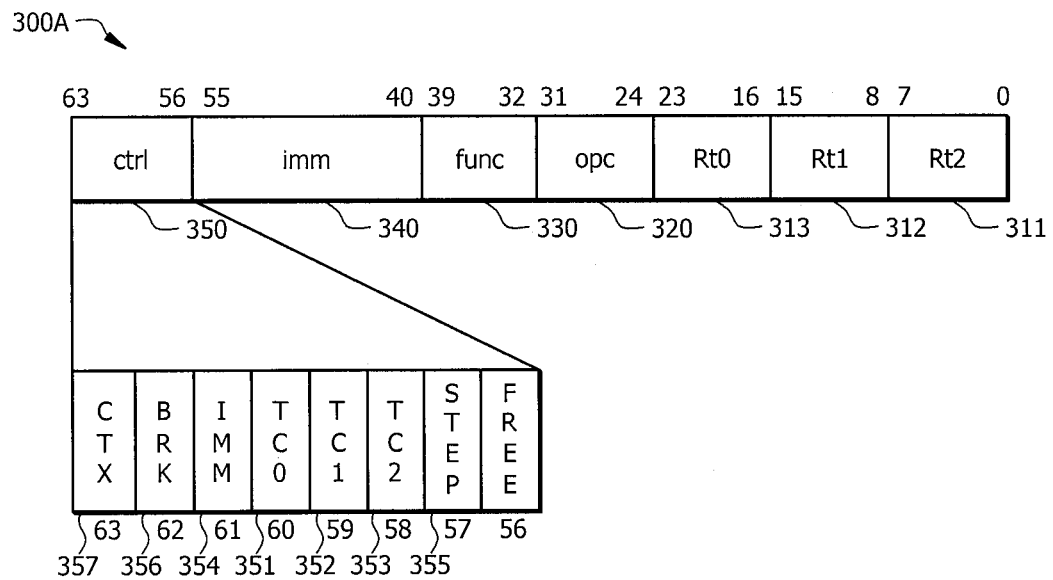
FIGS. 3A and 3B show exemplary instruction units as may be utilized by a hybrid multithreading framework of embodiments of the invention.
Figure 3B:
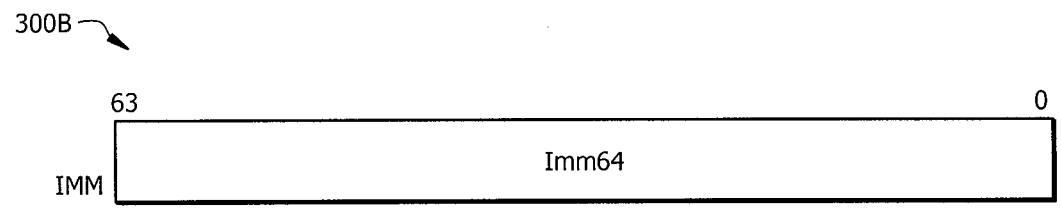

In accordance with an embodiment of the invention, all instruction payloads are of a predefined size, such as the 64-bit instruction payload of instruction unit 300A shown in FIG. 3A. For example, the minimum instruction unit may be a single 64-bit payload that contains a single HMTF instruction. The maximum instruction unit may be an integer multiple of the predefined payload (e.g., two 64-bit payloads comprised of 2 instruction units). In such a bundled format, the first payload may contain a HMTF instruction, such as instruction unit 300A of FIG. 3A, and the latter payload may contain an immediate value, such as instruction unit 300B of FIG. 3B. In operation according to embodiments of the invention, bundled instruction payloads are not permitted to span cache line boundaries in order to prevent page faults from occurring in the midst of an instruction execution cycle.

The HMTF instruction format implemented according to embodiments of the invention comprises a plurality of predefined fields, such as shown in the embodiment of instruction unit 300A illustrated in FIG. 3A. In particular, instruction unit 300A of FIG. 3A comprises three, eight-bit operand fields (shown as instruction operand fields 311-313), an instruction function field (shown as instruction function field 330), an instruction operation code field (shown as instruction operation code field 320), a sixteen bit signed immediate field (shown as immediate field 340), and a control field (shown as control field 350).

The control field of the HMTF instruction set format of embodiments comprises a unique instruction control block adapted to provide operation and control in accordance to the concepts herein. For example, in the embodiment of instruction unit 300A illustrated in FIG. 3A, one or more of the bits of instruction control field 350 may be utilized to provide debugging support and control, thread control, context switching control, immediate bundling control, etc. as described herein.

The operand fields of embodiments of the invention comprise the index value of the corresponding control or user register location. For example, indexes of 0 through 255 may be supported based upon the width of the fields. However, in operation according to embodiments of the invention, the number of user data registers present in each thread cache unit is specified by the hardware architect constructing the respective HMTF-derived implementation.

The instruction operand fields (e.g., fields 311-313) of embodiments index into the user data register block or the control register block as designated by interrogating thread control (TC) bits (shown as TC bits 351-353 of instruction control field 350) in the instruction's control block (e.g., values correspond to the operand fields of the base instruction payload). Setting a bit to a value of one indicates that the respective operand index references the control register file, whereas the default value of zero indicates that the operand index references the user-data register file according to embodiments.

The control register indexes of the operand fields (e.g., instruction operation code field 320) of embodiments include the aforementioned physically implemented control registers and a series of index macros that indicate specific cases in the instruction payload. For example, the control register indexes 0x01 and 0x02 hex may indicate that the operand in question is actually a sixteen-bit or sixty-four bit immediate value, respectively. Further decode may be utilized to determine if the immediate value is a bundled sixty-four bit immediate value. A positive value in a particular location of the control field (e.g., IMM bit 354 of control field 350) may signal the use of a sixty-four bit immediate bundle, for example.

The following table provides example HMTF register indexes for the operand fields (e.g., instruction operation code field 320) according to embodiments of the invention.

| Name | Index | Function |
| --- | --- | --- |
| R0-R255 | 0x00-0Xff | User data registers. Minimum of 16; maximum of 256 |
| ZERO | 0x00 | Zero value |
| IMM16 | 0x01 | Macro: Indicates IMM16 value |
| IMM64 | 0x02 | Macro: Indicates IMM64 value |
| PTID | 0x03 | Physical Thread Cache Unit ID |
| AECONST | 0x04 | Application Engine Constants |
| FPC | 0x05 | Function Pipe Control |
| TCC | 0x06 | Thread Cache Control |
| WQPTR | 0x07 | Work Queue Pointer |
| WFPTR | 0x08 | Work Free Pointer |
| WEPTR | 0x09 | Work Exception Pointer |
| RSVD0A-RSVD0C | 0x0A-0x0C | Reserved registers for the Workload Manager |
| TCS | 0x0D | Thread Cache Status |
| TCM | 0x0E | Thread Cache Mask |
| IP | 0x0F | Instruction Pointer |
| WUPTR | 0x10 | Work Unit Pointer |
| CC0-CC4 | 0x11-0x15 | Condition code registers 0-4 |
| TID.R | 0x16 | Relative thread/task ID |

-continued

| Name | Index | Function |
| --- | --- | --- |
| TID.P | 0x17 | Physical thread/task ID |
| FP | 0x18 | Frame Pointer |
| SP | 0x19 | Stack Pointer |
| RP | 0x1A | Return Pointer |
| PIC | 0x1B | Position Independent Code Pointer |
| UP1 | 0x1C | Uplevel Frame Pointer |
| SCR0-SCR2 | 0x1D-0x1F | Volatile scratch registers used for context save/restore |
| PMASK | 0x20 | Perf Counter Mask and Control |
| CLK | 0x21 | TCU-local Clock |
| PCLK | 0x22 | PSTATE: Clocks |
| PLOAD | 0x23 | PSTATE: Load Operations |
| PSTORE | 0x24 | PSTATE: Store Operations |
| PAMO | 0x25 | PSTATE: Atomic Memory Operations |
| PFE | 0x26 | PSTATE: Full/Empty Operations |
| PFLOP | 0x27 | PSTATE: Floating Point Operations |
| PIOP | 0x28 | PSTATE: Integer Operations |
| PEXEC | 0x29 | PSTATE: Executing Clocks |
| PCTX | 0x2A | PSTATE: Context Switches |
| PUDC0-4 | 0x2B-0x2F | User-defined performance counters |
| WLMR0 | 0x30 | Reserved for Workload Manager |
| EQ | 0x31 | "Equal To": Returns 0x01 |
| GT | 0x32 | "Greater Than": 0x02 |
| GTE | 0x33 | "GT+EQ": Returns 0x03 |
| LT | 0x34 | "Less Than": Returns 0x04 |
| LTE | 0x35 | "LT+EQ": Returns 0x05 |
| NE | 0x36 | "Not Equal To": Returns 0x06 |
| WLMR1 | 0x37 | Reserved for Workload Manager |
| RESERVED | 0x38-0x3F | RESERVED, UNUSED |

In operation according to embodiments of the invention, the HMTF instructions are functionally encoded via a set of eight-bit class and operation code (opcode) fields (e.g., instruction function field 330 and instruction operation code field 320, respectively), wherein similar instructions are preferably grouped into one of eight instruction operation codes. The instruction operation codes (e.g., instruction function field 330) of embodiments herein are represented in the table below. Each instruction class may, for example, have the potential for up to 256 instructions. In this manner, instruction encode and decode operations in hardware and software are very simple and efficient. A simple example of utilizing the paired instruction operation and function code is a register move instruction (MOV Ra,Rt). The instruction operation code for the move instruction is miscellaneous arithmetic with a function encoding of 0x01 in the example represented in the table below. The operation code for this instruction is 0x0B.

| Type | Operation Encoding | Description |
| --- | --- | --- |
| Load/Store | 0x00 | Memory load and store instructions for integer and floating point types [non-atomic] |
| Arith/Misc | 0x01 | Miscellaneous arithmetic instructions: Type conversion, selections, bit operations |
| Arith/Integer | 0x02 | Signed and unsigned integer arithmetic and combinatorial |
| Arith/Float | 0x03 | Single and double precision floating point arithmetic and combinatorial |
| Arith/User-Defined | 0x04 | User-defined load, store and arithmetic |
| Flow Control | 0x05 | Instruction flow control; branches, calls, return |

| Type | Operation Encoding | Description |
| --- | --- | --- |
| Atomic/Full-Empty | 0x06 | Extended memory semantic operations; atomic loads/stores, full-empty/tag-bit operations |
| Thread Control | 0x07 | Thread control operations |

HMTF User-Defined Instructions

The HMTF instruction set specification of embodiments comprises a unique set of user-defined instruction function codes. For example, the foregoing example HMTF instruction set provides for a unique set of user-defined instruction function codes under instruction operation code index 0x04. The user-defined operation code preferably contains blocks of predefined load, store and arithmetic instructions. By default, the base hardware instruction decoder of embodiments ignores this operation code. However, if the architect desires an instruction that does not currently exist in the HMTF canonical instruction set, this operation code can be enabled in the hardware decoder and the user-defined block can be utilized for any new instructions desired. The HMTF compiler, assembler, debugger and architectural simulation infrastructure of embodiments also have the ability to encode and decode these instructions such that the entire software infrastructure can immediately generate object files with any user-defined instructions desired. In this manner, the HMTF instruction format and framework of embodiments of the invention is extremely flexible and extensible.

HMTF Debugger Support

The HMTF and instruction set of embodiments is adapted to support the debugging capabilities of other general-purpose processors. However, such debugging support is difficult without specific instruction set support given the potential for a large number of concurrent threads or tasks. Accordingly, control bits were designated specifically to assist debugging capabilities according to embodiments herein.

For example, in the embodiment of instruction unit 300A illustrated in FIG. 3A, STEP bit 355 of instruction control field 350 is designated for use in debugging. When this bit contains a value of one, for example, the hardware-scheduling infrastructure may only allow the respective thread cache unit to execute, such that the subsequent execution progresses a single instruction at a time. Using such a step bit, the debugger has the ability to single step any instruction on any concurrent thread or task.

Instruction control field 350 of the illustrated embodiment also comprises a bit dedicated to signaling a breakpoint. Specifically BRK bit 356 may be utilized to signal the hardware scheduling mechanisms to initiate a context save operation of all currently executing thread cache units prior to execution of the candidate instruction. Such control permits the debugger to insert traditional software breakpoints on any candidate instruction within the HMTF infrastructure.

HMTF Concurrency Features

The HMTF and instruction set of embodiments is adapted to support application concurrency providing efficient parallelism. Historically, CMT and barrel processors have grappled with how and when to appropriate time-share internal processor resources. As discussed above, multi-threading implementation, such as SMT based multithreading, in which instructions from multiple threads are fetched, executed and retired on each cycle, and SOE based multi-threading, in which instructions from a single thread are fetched, executed and retired while particular events are used to initiate switching between the different threads, have traditionally been implemented to provide control for time-sharing internal processor resources. These techniques, however, often result in less than optimum processing efficiency and fail to provide the user, the programmer, or the compiler control over the thread scheduling and switching other than to implement a priori context switching periods or events.

However, applications may benefit from architectural features that hide multiple dimensions of latencies. For example, an application performing double precision floating point arithmetic on data that is sparse and irregular in nature may benefit from latency hiding techniques for both the arithmetic unit and the memory interfaces. Accordingly, the HMTF instruction format of embodiments has been designed to give the architecture, the runtime libraries, and/or the application ultimate control over how and when concurrency between thread cache units is initiated.

For example, one or more bit of the instruction payload may be designated as a context switch bit (CTX) for expressly controlling context switching. As shown in the embodiment of instruction unit 300A illustrated in FIG. 3A, CTX bit 357 of instruction control field 350 is designated as a context switch bit. In operation according to embodiments of the invention, when CTX bit 357 is set to positive, the context switch bit informs the hardware scheduling mechanisms that the respective thread cache unit is preparing to embark on a long latency event. The hardware scheduling mechanisms will subsequently begin to search for other candidate thread cache units to take its place in the current context frame. This operation is performed very early in the instruction pipeline. Accordingly, many context switch operations are single cycle events. The result is the express ability to control the application concurrency on a cycle-by-cycle granular level, as needed or desired.

Utilizing such context switch control information, embodiments of the invention are enabled to define context switches on an instruction-by-instruction basis. When the hardware of an HMTF implementation encounters that context switch control information (e.g., the aforementioned CTX bit), the hardware assumes that that current instruction its executing is going to in some way pend the core (e.g., the instruction may be a main memory load or other long latency event). Accordingly, the context switch control information informs the HMTF adapted hardware that during the time in which this instruction is attempting to get into the pipeline, proceed with execution of an instruction of another thread because the instruction of the present thread is going to stall. Accordingly, the actual context switch of embodiments occurs after initiation of the instruction providing the context switch information.

Context switch control information may be determined in a number of ways according to embodiments of the invention. In operation according to embodiments herein, the compiler used in generating the HMTF instructions sets the context control information (e.g., sets CTX bit 357 to either initiate a context switch or not) for each instruction. Such setting of the context control information may be under the control of compiler logic, manual selection, etc.

For example, compilers utilized according to embodiments of the invention comprise logic for optimization of scheduling of instructions, such as to efficiently accommodate memory loads, to uphold the order of operations in a given arithmetic statement, etc. The compiler, using such optimization logic, can determine that a number of operations are to be performed sequentially and analyze the code to determine when long latency events will occur in order to perform optimized instruction scheduling. Using the results of such analysis, the complier may operate to include context switch control information in association with any instructions for which a processing stall may otherwise occur.

Additionally or alternatively, a user (e.g., a programmer, hardware architect, etc.) may manually instantiate context switching using the context switch control information of embodiments. For example, a user may insert pragmas into the code, such as where the user believes (e.g., after doing performance optimization, testing the performance, etc.) the context switches implemented by the compiler logic is not optimized, in order to expressly control the context switching at these additional places.

The threads for which context switching has been implemented may again return to execution in a number of ways. For example, instructions that are pending may be placed into a queue or buffer for later selection for resumed execution. In operation according to embodiments, a pending instruction may be selected from a buffer when the operation of the instruction returns.

Embodiments of the invention implement a counter-based pending thread return technique. For example, a counter of the hardware operates to provide a countdown related to the pending operations for that thread (e.g., a countdown of the number of outstanding events for a pending thread) to avoid reinitiating the pending thread until it's pending operations have completed. In operation according to embodiments, the hardware will not allow a pending thread to execute until that counter has counted down to zero.

Embodiments of the foregoing counter-based pending thread return technique implement hazards-based counter adjustments, wherein a hazard provides the ability for the hardware to determine whether or not a particular resource (e.g., a register) is available for use. For example, where the pending thread initiates a divide instruction, that instruction may take between 50 and 100 cycles to complete and return a result to a particular register. Accordingly, the hardware may set a hazard with respect to that particular register to indicate that a hardware process, in this case the divide unit, is in the process of feeding a value into this register. In operation according to embodiments of the invention, the hazard is used to increase the aforementioned countdown counter such that the function units will not allow the associated pending thread to execute until those operations have been completed.

The HMTF and instruction set concurrency features of embodiments extend beyond the base instruction set format described above. Various concurrency features may, for example, be provided to eliminate the maximum number of arithmetic unit stall cycles given sufficient application parallelism. For example, a hardware scheduling algorithm implemented as a part of the workload manager module may operate to force the current thread cache unit to context switch on one of a plurality of conditions, as discussed below.

As discussed above, a context switch condition implemented according to embodiments of the invention is the instruction-initiated condition. If the current instruction has flagged the CTX bit in the instruction payload control block, the workload manager of embodiments will begin a context switch event. The compiler will preferably attempt to determine when appropriate explicit context switch events should occur based on its register allocation algorithms and the intermediate representation of the target region. However, when appropriate context switch points cannot be automatically determined, the user has the ability to initiate these events from software using pragmas, directives or runtime library interfaces. Such explicit context switch conditions may, for example, appear in the generated code as INSTRUCTION.CTX. For example, an unsigned 64-bit load instruction with an explicit context switch may appear has LD.UQ.CTX $0(% R5), % R6. It should be appreciated that all instructions in the HMTF instruction set of embodiments can be set to explicitly context switch.

Another context switch condition implemented according to embodiments of the invention is a simple register hazard. If any instruction encounters a hazard that has yet to clear when attempting to perform a read operation from the respective register file, for example, the workload manager may assume a long latency event and force the context switch. This context switch condition may also include a hazard event signal from the associated instruction cache etc. If an instruction miss is taken, the workload manager of embodiments assumes a long-latency hazard and forces the thread cache unit to context switch.

Still another context switch condition implemented according to embodiments of the invention comprises an implicit context switch operation. For example, the workload manager may enforce a time-division-multiplexed (TDM) period (e.g., a predetermined maximum context period, such as sixteen uninterrupted clock cycles) before forcing the current thread cache unit to yield its context. Interruptions, in this context, could include any other context switch events such as register hazards or explicit context switched instructions. This context switch condition prevents any thread cache unit from preventing other thread cache units from executing, regardless of the instruction stack.

In operation according to embodiments, when the workload manager begins to initiate a context switch event, it determines which thread cache unit is the next candidate for execution. This process may comprise a plurality of stages. For example, the workload manager may initially scan an internal thread cache mask register. This register may, for example, comprise a mask for each of the thread cache units containing active work. Those thread cache units that contain active work units are flagged as positive. Once the workload manager has determined which thread cache units have representative work, the workload manager of embodiments may begin to scan the Nth+1 thread cache unit for register hazards. Such a round-robin scan implemented according to embodiments is designed to find the next candidate thread cache unit with the ability to execute at least one instruction without stalling. If a candidate thread cache unit is found without register hazards, the workload manager of embodiments begins initiates context switching a new candidate into the context frame. If, however, the workload manager does not find any candidate thread cache units without register hazards, the workload manager of embodiments performs no context switch and allows the pipe to stall.

HMTF Power Efficiency Features

The HMTF instruction set of embodiments comprises a unique set of thread-control instructions that are designed to assist in efficient power utilization of each AE. Such instructions may be utilized to quickly determine if candidate work exists or to idle the unused hardware state in order to maximize power efficiency according to embodiments of the invention.

For example, an idle instruction may be provided which is designed to be the final instruction executed by a thread cache unit prior to the respective work unit is destroyed. This instruction may thus inform the workload manager that the respective thread cache unit has no additional instructions to execute. The workload manager, in participation with the software runtime, may subsequently attempt to find candidate work units to execute. If no candidate work units are found for execution, the respective thread cache unit is idled according to embodiments herein. As a result, it will no longer be considered for any context switch scheduling events, thus eliminating any potential transition states through its register files.

The HMTF instruction set of embodiments may additionally or alternatively include a complementary fire instruction. Such an instruction may, for example, be broadcasted to all the workload managers present on all the AE. The result according to embodiments is an immediate wakeup signal to begin searching for more candidate work units. This instruction may be executed as a part of the software runtimes in order to inform the hardware that additional work units have been spawned.

HMTF Novel Instruction Set Examples

The HMTF instruction set of embodiments herein has the ability to assist higher level programming models to efficiency scale thread and task parallelism. It is common to find applications that include thread or task-local storage using arrays, such as in OpenMP-parallel applications. With the inclusion of the HMTF physical and local control registers (e.g., TID.P and TID.R, respectively, as shown in the example HMTF register indexes for the operand fields above) users and runtime libraries can very quickly address thread-local array storage. An example of addressing thread local storage using CHOMP™ assembly in as little as two instructions, as shown below.

Thread local addressing:

```
...
#-- %r5 is base address
#-- %r6 is offset
#-- %r8 is target
#-- array stride is $8
#-- calculate thread-local offset
mul.uq    %tid.r, $8, %r6
#-- load thread-local value using offset
ld.uq     %r6(%r5), %r8
...
```

In the same manner, OpenMP task-parallel applications may attempt to control the intermediate task concurrency using constructs present in the OpenMP 3.1 specification. For example, task-parallel applications make use of the OpenMP taskyield directive. This directive is often difficult for the respective OpenMP runtime implementation. The HMTF architecture of embodiments herein has the ability to complete a task-yield operation with a single instruction in two clock cycles using the NOP.CTX instruction of a CHOMP™ embodiments, as shown below.

OpenMP taskyield:

```
...
#-- yield the current context
#-- perform no arithmetic
#-- explicitly context switch
nop.ctx
```

HMTF Instruction Cache Locality

Optimizing thread and task concurrency on traditional microprocessors can be achieved through the use of intelligent data cache locality algorithms. Optimizing data locality provides the highest potential for cache reuse, thus reducing the overall pressure on main memory. However, the HMTF of embodiments does not contain explicit data caches. In operation according to embodiments, all in-situ dynamic processor state is contained within the respective thread cache unit register files, wherein the only architectural module that contains shared state is the instruction cache associated with each function pipe group.

An area of locality optimization for implementing HMTF architectures is related to static and common variable reuse. As shown above, the HMTF instruction format of embodiments includes a sixteen bit signed immediate value field in the instruction payload as well as the potential to bundle a second instruction payload with a sixty-four bit immediate value. This bundled instruction format is very useful in optimizing thread and task locality for applications when a large number of instructions are shared among threads.

A simple example of this is an OpenMP parallel loop construct. As shown in the redundant constant value load operations example below, each thread performs a redundant load operation of the constant variable utilized within the loop.

Example of redundant constant value load operations:

```
const uint64_t cvar = 0x0000D1FE;
uint64_t a[N];
int i;
#pragma omp parallel for shared( cvar , a )
for( i=0; i<N; i++)
{
    a[i] = a[i]*cvar;
}
...
ld.uq    $0(%r0),%r1        #-- load 'i'
ld.uq    %r1(%r2), %r5      #-- load a[i]
ld.uq    $0(%r3), %r6       #-- load cvar
mul.uq   %r5, %r6, %r8      #-- mul a[i]*cvar
st.uq    %r8 %r1(%r2)       #-- store a[i]
```

As can be appreciated from the foregoing example, for N threads the application requires N load operations. If this value were automatically collapsed into a sixty-four bit immediate value using compiler optimization techniques or preprocessed macros, the immediate value will actually become cached and subsequently reused from within the instruction cache. This reduces the load pressure for this individual value from the constant N, to N/M; where M is the number of thread cache units associated with each function pipe group. A simple example of this optimization is shown in the optimized constant value load operations example below.

Example of optimized constant value load operations:

```
#define cvar 0x0000D1FE;
uint64_t a[N];
int i;
#pragma omp parallel for shared( a )
for( i=0; i<N; i++ )
{
    a[i] = a[i]*(uint64_t)(cvar);
}
...
ld.uq    $0(%r0),%r1              #-- load 'i'
ld.uq    %r1 (%r2), %r5           #-- load a[i]
#-- the value of 'cvar' is cached in the ICACHE
mul.uq   %r5, $0xD1FE, %r8        #-- mul a[i]*cvar
st.uq    %r8 %r1(%r2)             #-- store a[i]
```

The HMTF runtime may operate to interrogate the work unit's potential instruction region, such as by searching for idle instructions following the starting instruction pointer, in order to perform dynamic work unit placement based upon what is known about the application's instruction text space. Ignoring the obvious instruction divergence via branch operations, this provides a reasonable estimate of where the work unit will operate in the instruction space. Accordingly, certain scheduling decisions can be made in order to optimize the placement of the work unit alongside other work units that share a similar instruction region, to thereby eliminate redundant loading of instruction text for work units executing similar code.

HMTF Instruction Set Extensions for Nested Parallelism

As multicore processors become increasingly dense, mining sufficient parallelism from application kernels becomes paramount in order to cover the latency to memory. The HMTF instruction set and runtime system of embodiments may be adapted to instantiate nested parallelism via spawning new work units with the appropriate control register values. These spawn operations result in heavy use of coprocessor main memory and, as such, are generally not optimal for spawning small units of work. Furthermore, each thread cache unit of embodiments acts as an autonomous unit and thus has no knowledge of its adjacent thread cache units. The hardware scheduler associated with each function pipe is the only tightly coupled mechanism shared amongst the respective thread cache units according to certain embodiments. As such, a work unit duplication [dupe] instruction may be provided that is executed via the hardware scheduler unit, whereby the instruction accepts a new instruction pointer as an argument and duplicates the other necessary control register values to a new work unit. Such an instruction provides a very high performance mechanism to spawn new work units that share the same stack and heap without accessing main memory.

Various features and attributes of a HMTF architecture and instruction set have been described herein. It should be appreciated that when implemented in software, the elements of the present invention are essentially the code segments, operable upon a host processor-based system, to perform tasks as described herein. The host processor-based system may comprise one or more general purpose processor (e.g., a processor from the CORE line of processors available from Intel Corporation) and/or one or more special purpose processors (e.g., an application specific integrated circuit (ASIC), FPGA, etc.) having memory and appropriate resources (e.g., input/output resources, mass storage resources, etc.) for executing the code segments for operation as described herein. The program or code segments can be stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The code segments may be downloaded via computer networks such as the Internet, Intranet, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining, on an instruction-by-instruction basis, instruction control information for selectively controlling multithreaded execution of executable code segments of instructions executable upon one or more processing units of a multicore processor-based system, wherein the instruction control information includes context switching control information configured to inform a processing unit of the one or more processing units of the multicore processor-based system whether to initiate a thread switch from a thread in which an executable code segment of an instruction corresponding to the context switching control information is executed by the processing unit to another thread executed by the processing unit and thread control information configured to designate to the processing unit of the multicore processor-based system between an operand field of an executable code segment of the instruction corresponding to the thread control information (i) indexing to a user data register block of the multicore processor-based system and (ii) indexing to a control register block of the multicore processor-based system, wherein the thread control information comprises information for a plurality of operands of the executable code segment of the instruction corresponding to the thread control information, wherein the information of the thread control information includes information corresponding to each operand of the plurality of operands and independently designates to the processing unit that the corresponding operand indexes to one of the user data register block and the control register block; and including the instruction control information having the context switching control information and the thread control information in an instruction format having one or more instruction control information fields and one or more executable code segment fields, wherein the thread control information is fully contained in an instruction control information field of the one or more instruction control information fields separate from the plurality of operands contained in the one or more executable code segment fields.

2. The method of claim 1, further comprising:
   analyzing code, from which the instructions are generated, for instruction scheduling, wherein the determining instruction control information is based at least in part on the analyzing.

3. The method of claim 2, wherein the analyzing comprises:
   analyzing the executable code segments to determine when long latency events will occur.

4. The method of claim 2, wherein the analyzing comprises:
analyzing the executable code segments for pragmas inserted into the code for controlling execution of the instructions.

5. The method of claim 1, wherein the instruction format includes the instruction control information field in which the instruction control information having the context switching control information and the thread control information of the instruction corresponding to the thread control information is carried and the one or more executable code segment fields in which the executable code segment of the instruction corresponding to the thread control information is carried, wherein the one or more executable code segment fields includes the operand field.

6. The method of claim 1, wherein a control register of the control register block comprises a user defined register corresponding to the thread control information.

7. The method of claim 1, wherein a control register of the control register block comprises a macro index indicating a specific case of a payload corresponding to the thread control information.

8. The method of claim 1, wherein a control register of the control register block comprises a thread cache control register corresponding to the thread control information.

9. The method of claim 1, wherein a control register of the control register block comprises context switch information corresponding to the thread control information.

10. The method of claim 1, wherein the instruction control information further includes debugging support and control information configured to support debugging capabilities of the processing unit.

11. The method of claim 10, wherein the debugging support and control information comprises a step bit controlling subsequent execution to progress a single instruction at a time.

12. The method of claim 10, wherein the debugging support and control information comprises a break bit signaling a breakpoint to initiate a context save operation of all currently executing thread cache units of the multicore processor-based system prior to execution of the executable code segment of the instruction corresponding to the thread control information.

13. The method of claim 1, wherein the instruction control information further includes immediate bundling control information configured to signal that a latter instruction unit comprises an immediate value to be bundled with the instruction corresponding to the thread control information.

14. A method comprising: determining instruction control information for selectively controlling multithreaded execution of executable code segments of instructions executable upon one or more processing units of a multicore processor-based system, wherein the instruction control information of a first instruction unit includes (a) context switching control information configured to inform a processing unit of the one or more processing units of the multicore processor-based system whether to initiate a thread switch from a thread in which an executable code segment of the first instruction unit is executed by the processing unit to another thread executed by the processing unit, (b) thread control information configured to designate to the processing unit of the multicore processor-based system between an operand field of the executable code segment of the first instruction unit (i) indexing to a user data register block of the multicore processor-based system and (ii) indexing to a control register block of the multicore processor-based system, and (c) immediate bundling control information configured to signal that a latter instruction unit comprises an immediate value to be bundled with the first instruction unit, wherein the first instruction unit comprises the executable code segment and the latter instruction unit comprises the immediate value used by the executable code segment of the first instruction unit; and including the instruction control information having the context switching control information, the thread control information, and the immediate bundling control information in an instruction control field of an instruction format that includes the instruction control field and one or more fields in which a corresponding executable code segment is carried, wherein the one or more fields includes the operand field, wherein the thread control information is fully contained in the instruction control field separate from the operand field; and wherein the thread control information comprises thread control information for a plurality of operands of the executable code segment of the first instruction unit, wherein thread control information corresponding to each operand independently informs the processing unit whether the corresponding operand relates to the user data register block or the control register block.

15. The method of claim 14, wherein a control register of the control register block comprises a user defined register corresponding to the thread control information.

16. The method of claim 14, wherein a control register of the control register block comprises a macro index indicating a specific case of a payload corresponding to the thread control information.

17. The method of claim 14, wherein a control register of the control register block comprises a thread cache control register corresponding to the thread control information.

18. The method of claim 14, wherein a control register of the control register block comprises context switch information corresponding to the thread control information.

19. The method of claim 14, wherein the instruction control information further includes debugging support and control information configured to support debugging capabilities of the processing unit.

20. The method of claim 19, wherein the debugging support and control information comprises a step bit controlling subsequent execution to progress a single instruction at a time.

21. The method of claim 19, wherein the debugging support and control information comprises a break bit signaling a breakpoint to initiate a context save operation of all currently executing thread cache units of the multicore processor-based system prior to execution of the executable code segment of the first instruction unit.

* * * * *